United States Patent
Nomura et al.

(10) Patent No.: US 9,176,578 B2
(45) Date of Patent: Nov. 3, 2015

(54) CONTROL APPARATUS, CONTROL METHOD, PROGRAM, INPUT SIGNAL RECEIVING APPARATUS, OPERATION INPUT APPARATUS, AND INPUT SYSTEM FOR PERFORMING PROCESSING WITH INPUT UNITS ON DIFFERENT SURFACES

(75) Inventors: Eisuke Nomura, Tokyo (JP); Ryouhei Yasuda, Kanagawa (JP); Kazuyuki Yamamoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 33 days.

(21) Appl. No.: 14/123,144

(22) PCT Filed: May 24, 2012

(86) PCT No.: PCT/JP2012/063269
§ 371 (c)(1),
(2), (4) Date: Nov. 29, 2013

(87) PCT Pub. No.: WO2012/172950
PCT Pub. Date: Dec. 20, 2012

(65) Prior Publication Data
US 2014/0118247 A1    May 1, 2014

(30) Foreign Application Priority Data

Jun. 17, 2011 (JP) .................................. 2011-135767
Jun. 30, 2011 (JP) .................................. 2011-146726

(51) Int. Cl.
*G06F 3/033* (2013.01)
*G06F 3/01* (2006.01)
*H04N 21/422* (2011.01)
*G08C 17/00* (2006.01)

(52) U.S. Cl.
CPC *G06F 3/01* (2013.01); *G08C 17/00* (2013.01); *H04N 21/42212* (2013.01); *H04N 21/42214* (2013.01); *H04N 21/42215* (2013.01); *H04N 21/42224* (2013.01); *G08C 2201/30* (2013.01)

(58) Field of Classification Search
CPC ......... G06F 3/01; G06F 3/041; G06F 3/0414; G06F 3/042; G06F 3/0421; G06F 3/044
USPC ................................... 345/156–178
See application file for complete search history.

(56) References Cited

U.S. PATENT DOCUMENTS

| 7,480,379 B2 * | 1/2009 | Yoshikawa ............... 379/433.06 |
| 2009/0005130 A1 * | 1/2009 | Ishikura et al. ............ 455/575.3 |

(Continued)

FOREIGN PATENT DOCUMENTS

| JP | 2001-494 A | 1/2001 |
| JP | 2004-221683 A | 8/2004 |

(Continued)

OTHER PUBLICATIONS

International Search Report issued Aug. 21, 2012 in PCT/JP2012/063269.

*Primary Examiner* — Vijay Shankar
(74) *Attorney, Agent, or Firm* — Hazuki International, LLC

(57) ABSTRACT

There is provided a control apparatus including an input signal receiving unit that receives a first input signal generated in accordance with an operation on a first operation receiving unit provided on a first surface of an operation input apparatus and a second input signal generated in accordance with an operation on a second operation receiving unit provided on a second surface, which is different from the first surface, of the operation input apparatus, an opposing information acquisition unit that acquires opposing information indicating which surface of the first surface and the second surface is opposed to an operator of the operation input apparatus, and a processing controller that changes one of first processing corresponding to the first input signal and second processing corresponding to the second input signal based on the acquired opposing information.

19 Claims, 30 Drawing Sheets

(56) References Cited

U.S. PATENT DOCUMENTS

2009/0322552 A1    12/2009   Machimura et al.
2011/0143819 A1*   6/2011   Sugiyama et al. ............ 455/566

FOREIGN PATENT DOCUMENTS

| | | |
|---|---|---|
| JP | 2007-81679 A | 3/2007 |
| JP | 2010-11286 A | 1/2010 |

* cited by examiner

FIG. 3
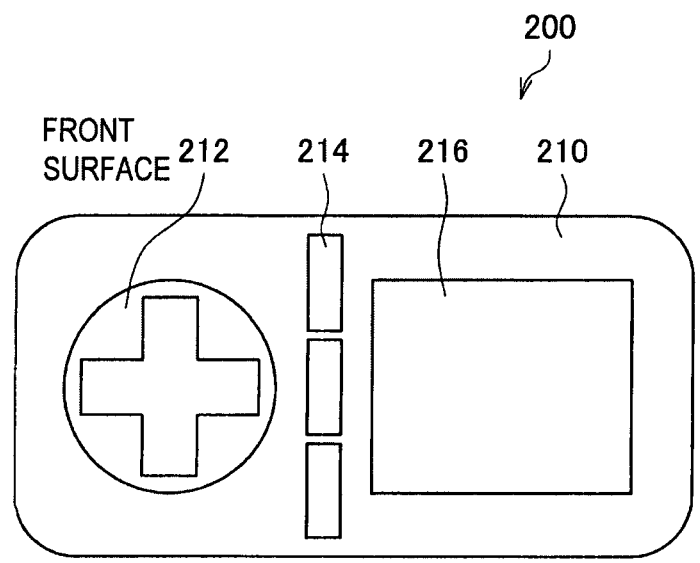
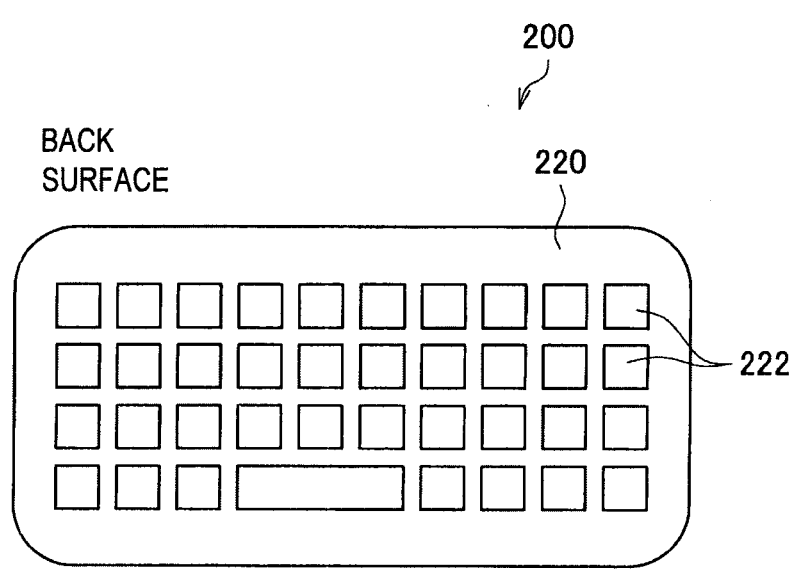

FIG. 7
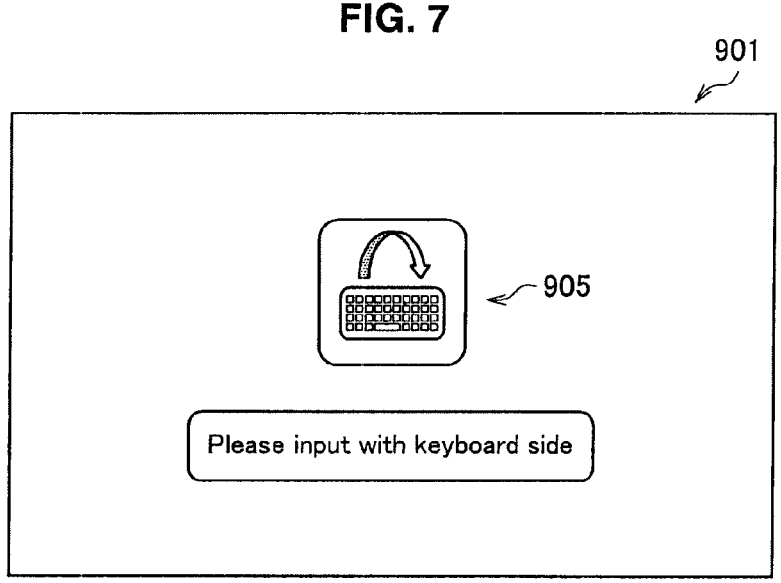
FIG. 8
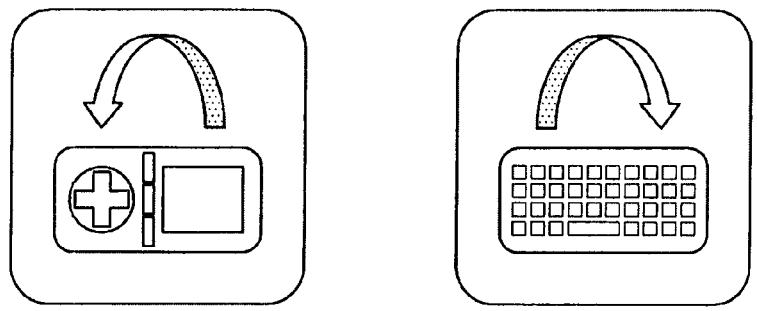
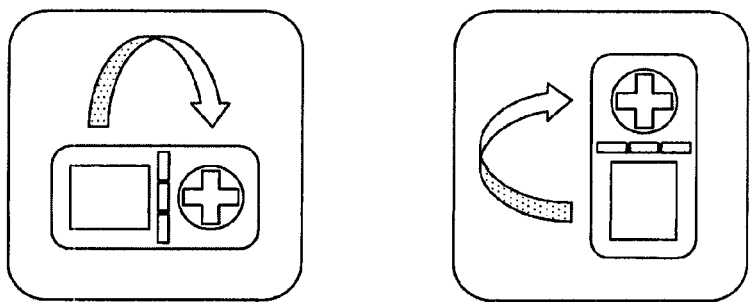

FIG. 9
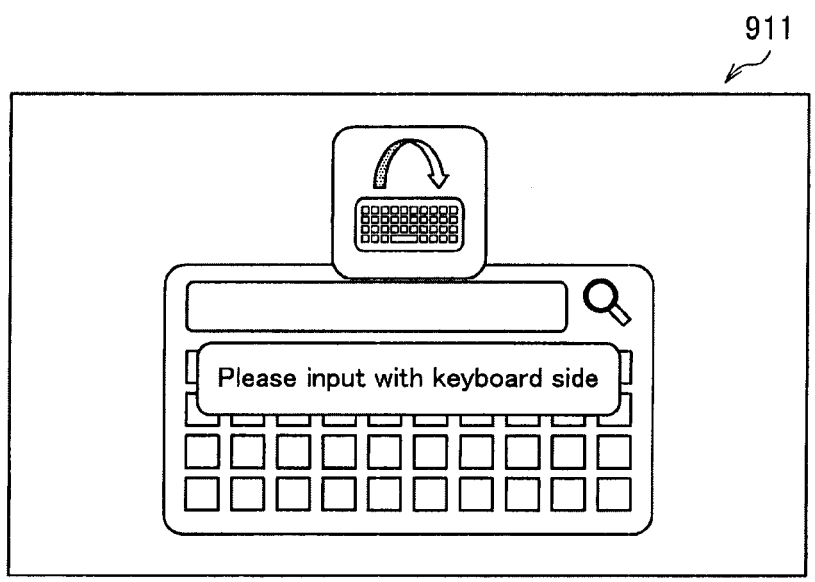
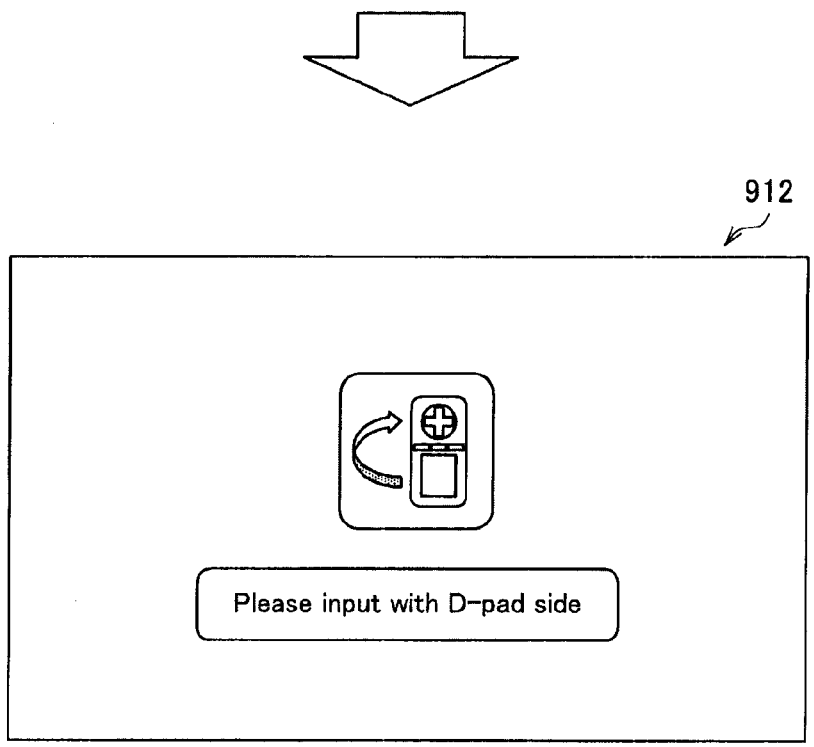

FIG. 10
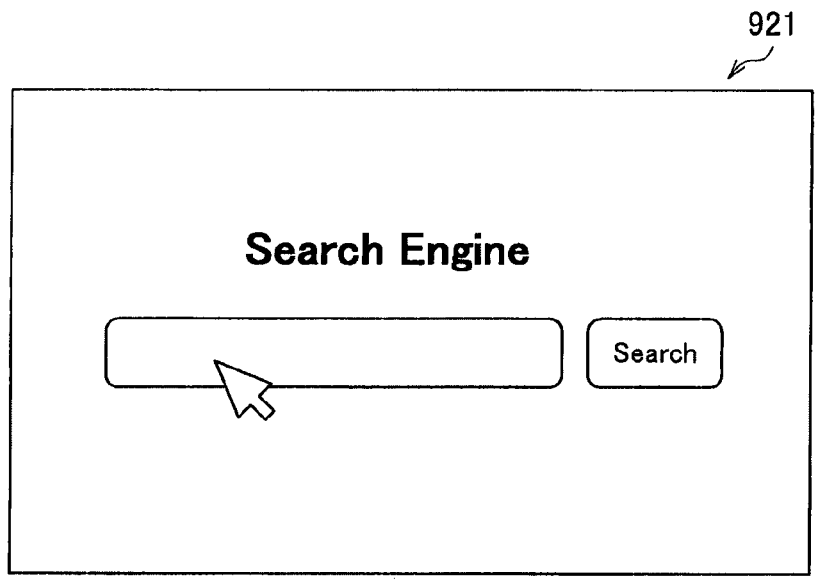
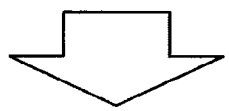
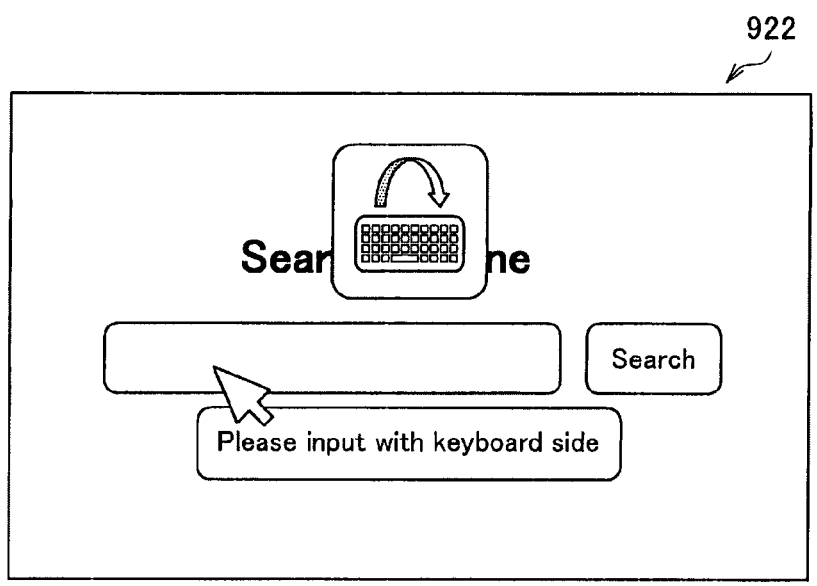

FIG. 11
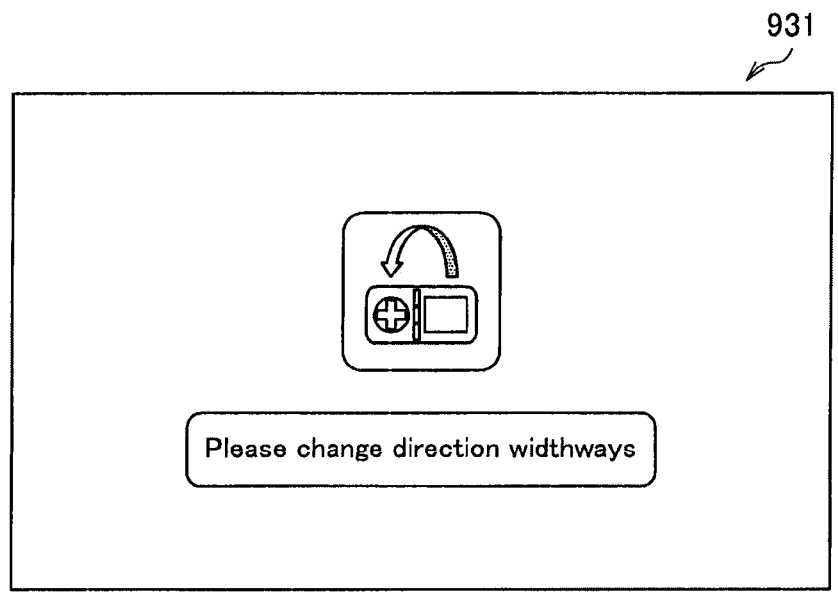
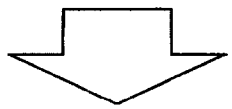
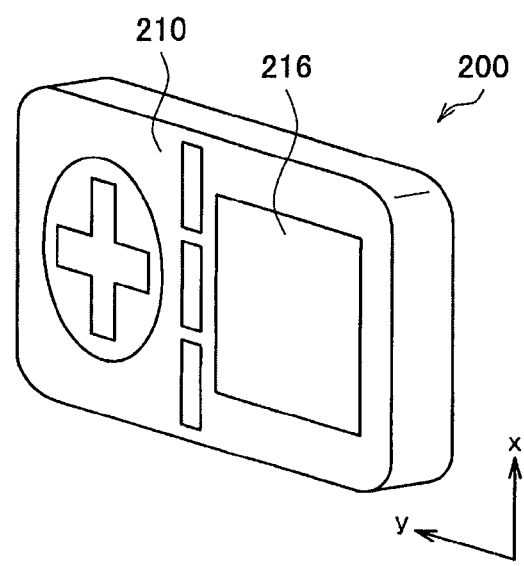

FIG. 12
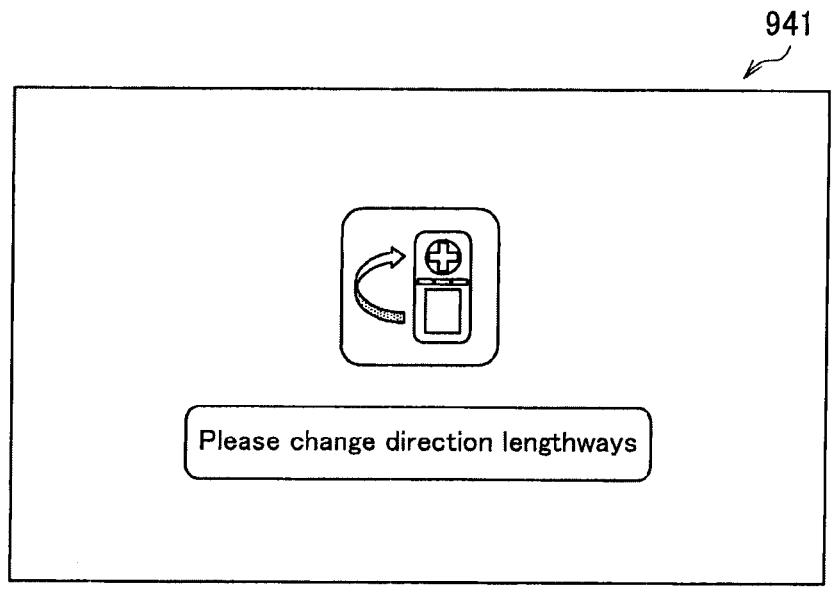
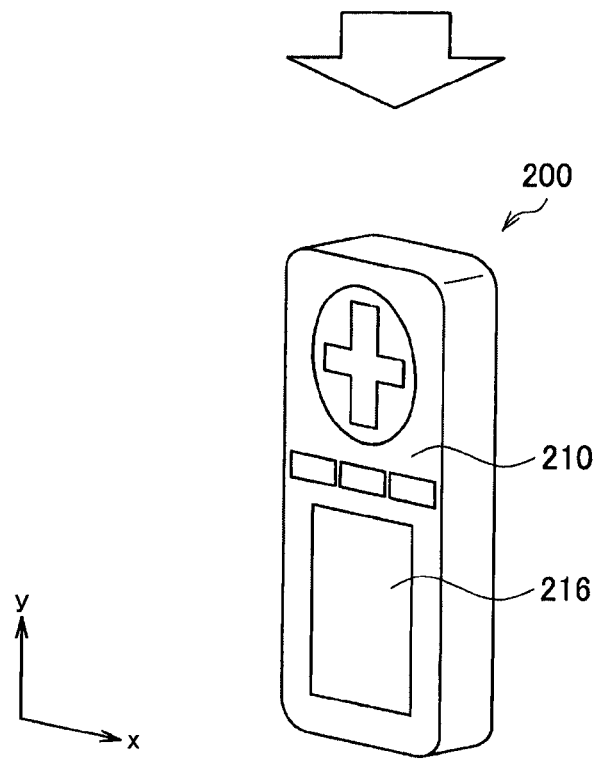

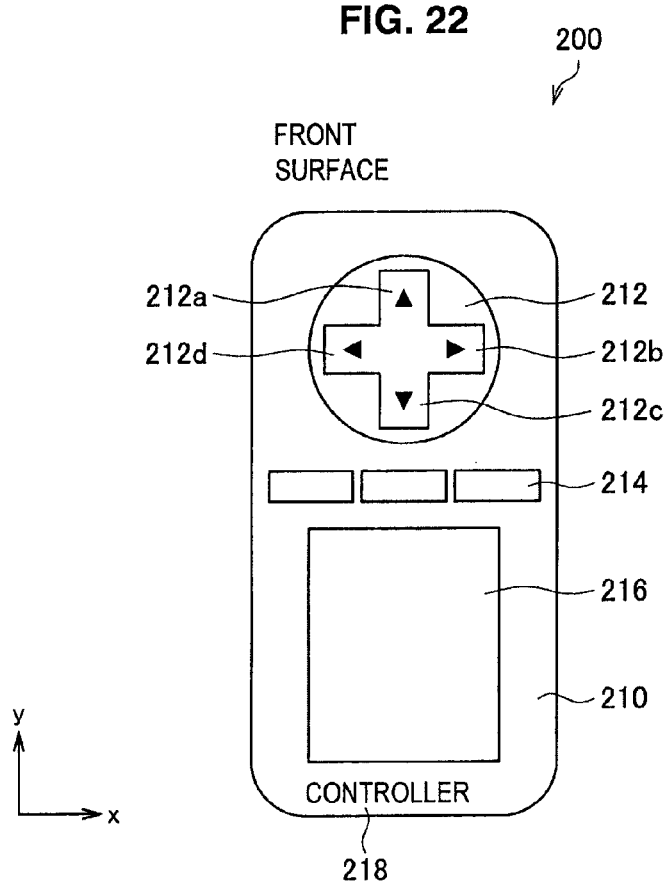
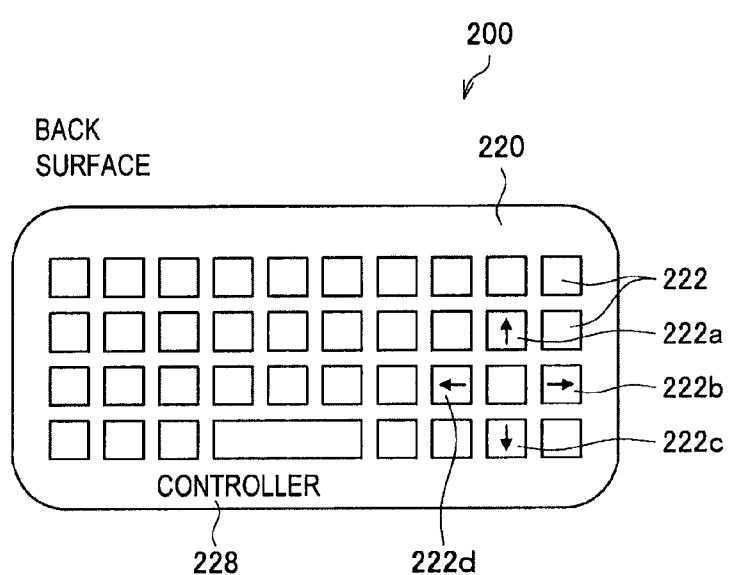

STATE C2

FIG. 30
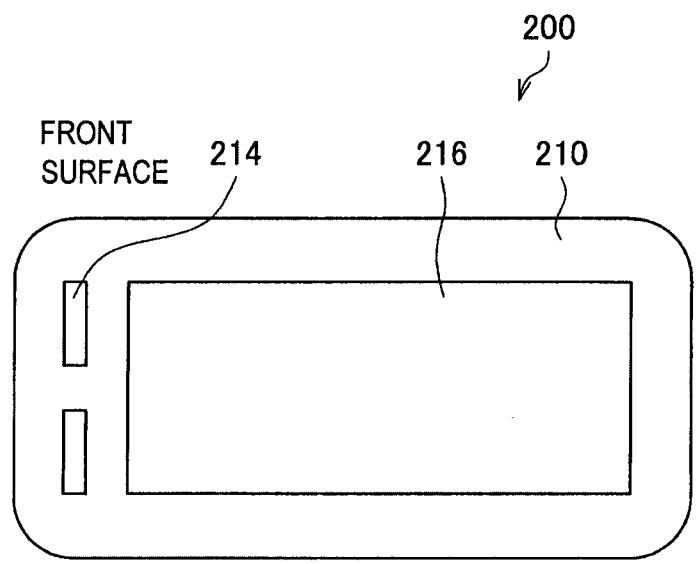
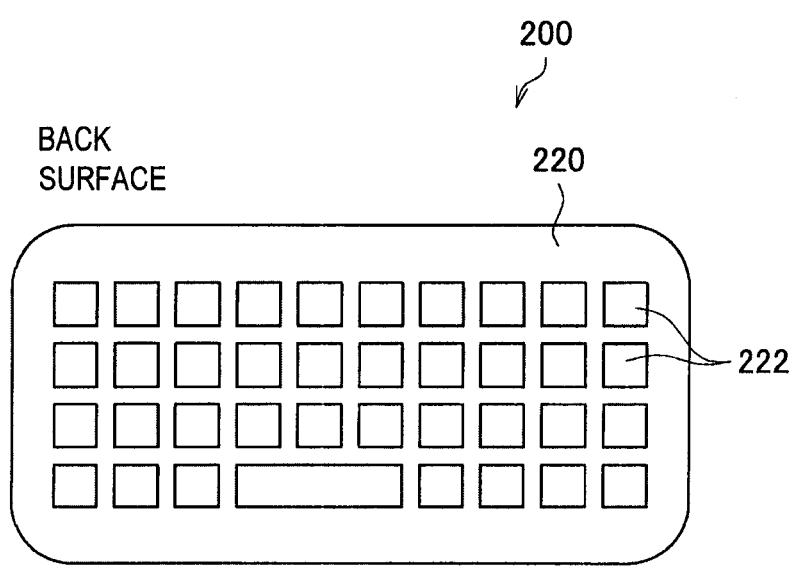

FIG. 31
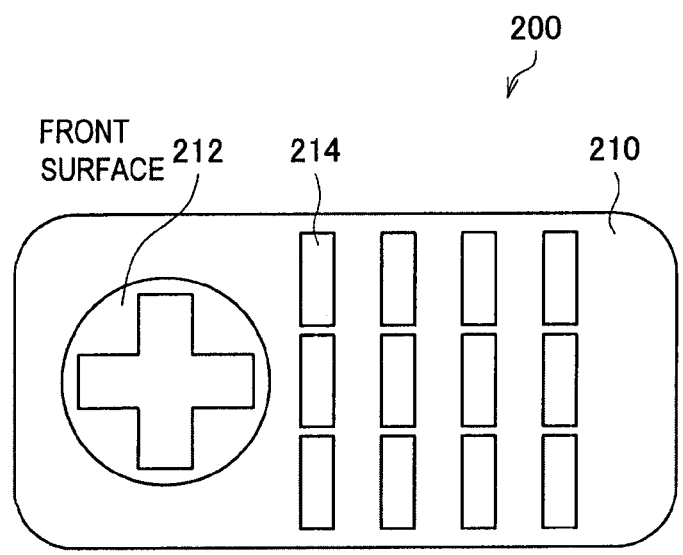
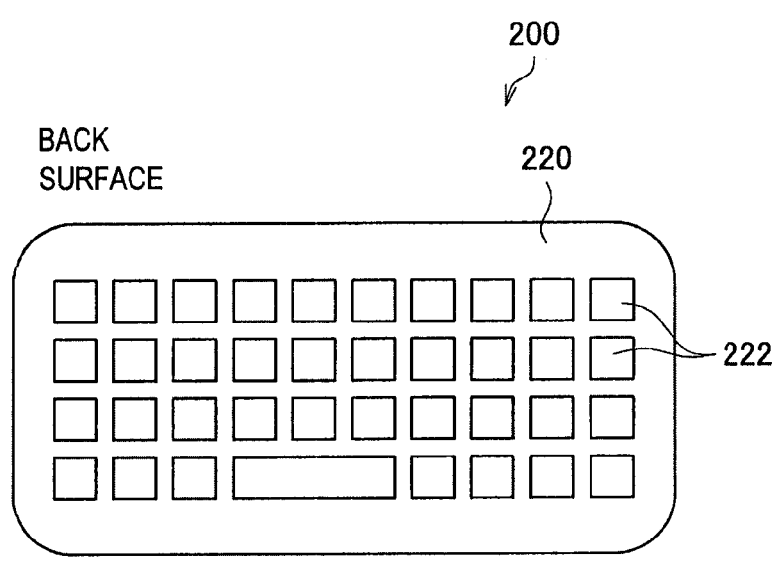

FIG. 32
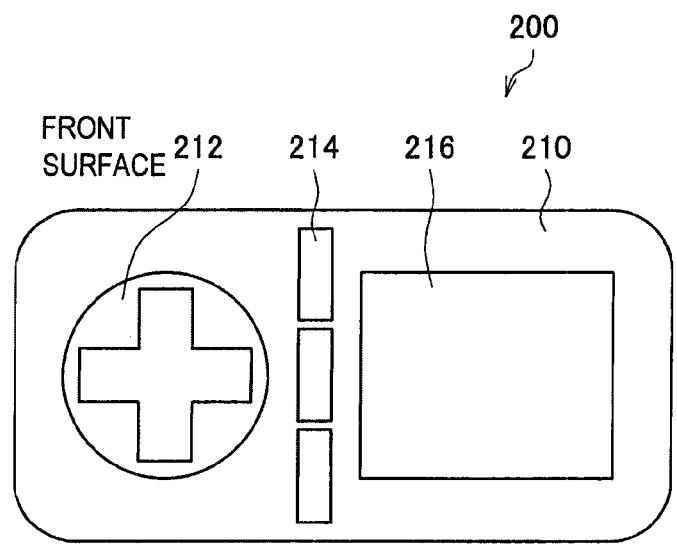
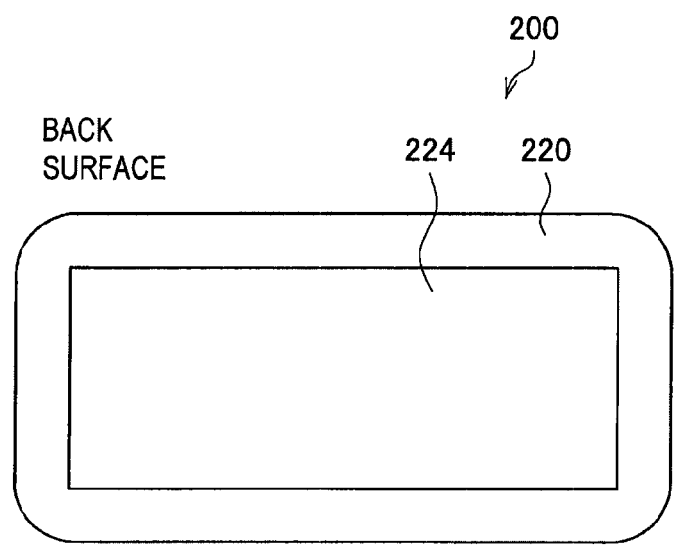

CONTROL APPARATUS, CONTROL METHOD, PROGRAM, INPUT SIGNAL RECEIVING APPARATUS, OPERATION INPUT APPARATUS, AND INPUT SYSTEM FOR PERFORMING PROCESSING WITH INPUT UNITS ON DIFFERENT SURFACES

TECHNICAL FIELD

The present disclosure relates to a control apparatus, a control method, a program, an input signal receiving apparatus, an operation input apparatus, and an input system.

BACKGROUND ART

In recent years, the television realizes various functions with the development of hardware technology. The user does input into the television using an operation input apparatus like, for example, a remote control to cause the television to execute a desired function. Then, various devices are examined as the operation input apparatus (see Patent Literature 1).

CITATION LIST

Patent Literature

Patent Literature 1: JP H11-143606A

SUMMARY OF INVENTION

Technical Problem

It is necessary to secure space to arrange a plurality of operation receiving units in the operation input apparatus with requests for realization of various input forms by the operation input apparatus. On the other hand, the operation input apparatus is used by being held by the user and thus, there are requests for miniaturization of the operation input apparatus. To respond to such two kinds of requests, a configuration of providing respective operation receiving units on different surfaces of the operation input apparatus can be considered.

However, when respective operation receiving units are provided on different surfaces of the operation input apparatus, the configurations and operation receiving modes of the operation receiving units provided on each surface are assumed to be different from each other. Thus, if, for example, the user inputs an operation erroneously, desired processing may not be performed.

Therefore, the present disclosure proposes a method of appropriately performing desired processing when the user does an operation input using an operation input apparatus provided with operation receiving units on different surfaces.

Solution to Problem

According to an embodiment of the present disclosure, there is provided a control apparatus including an input signal receiving unit that receives a first input signal generated in accordance with an operation on a first operation receiving unit provided on a first surface of an operation input apparatus and a second input signal generated in accordance with an operation on a second operation receiving unit provided on a second surface, which is different from the first surface, of the operation input apparatus, an opposing information acquisition unit that acquires opposing information indicating which surface of the first surface and the second surface is opposed to an operator of the operation input apparatus, and a processing controller that changes one of first processing corresponding to the first input signal and second processing corresponding to the second input signal based on the acquired opposing information.

Further, according to an embodiment of the present disclosure, there is provided a control method including receiving a first input signal generated in accordance with an operation on a first operation receiving unit provided on a first surface of an operation input apparatus and a second input signal generated in accordance with the operation on a second operation receiving unit provided on a second surface, which is different from the first surface, of the operation input apparatus, acquiring opposing information indicating which surface of the first surface and the second surface is opposed to an operator of the operation input apparatus, and changing one of first processing corresponding to the first input signal and second processing corresponding to the second input signal based on the acquired opposing information.

Further, according to an embodiment of the present disclosure, there is provided a program causing a computer to execute receiving a first input signal generated in accordance with an operation on a first operation receiving unit provided on a first surface of an operation input apparatus and a second input signal generated in accordance with the operation on a second operation receiving unit provided on a second surface, which is different from the first surface, of the operation input apparatus, acquiring opposing information indicating which surface of the first surface and the second surface is opposed to an operator of the operation input apparatus, and changing one of first processing corresponding to the first input signal and second processing corresponding to the second input signal based on the acquired opposing information.

Further, according to an embodiment of the present disclosure, there is provided an input signal receiving apparatus including an input signal receiving unit that receives, from the operation input apparatus, a first input signal generated in accordance with an operation on a first operation receiving unit provided on a first surface of an operation input apparatus and a second input signal generated in accordance with the operation on a second operation receiving unit provided on a second surface, which is different from the first surface, of the operation input apparatus, an opposing information receiving unit that receives, from the operation input apparatus, opposing information indicating which surface of the first surface and the second surface is opposed to an operator of the operation input apparatus, and a processing controller that changes one of first processing corresponding to the first input signal and second processing corresponding to the second input signal based on the received opposing information.

Further, according to an embodiment of the present disclosure, there is provided an operation input apparatus including a first operation receiving unit provided on a first surface of a housing, a second operation receiving unit provided on a second surface, which is different from the first surface, of the housing, an input signal receiving unit that receives a first input signal generated in accordance with an operation on the first operation receiving unit and a second input signal generated in accordance with the operation on the second operation receiving unit, a determination unit that determines which surface of the first surface and the second surface is opposed to an operator, and a processing controller that changes one of first processing corresponding to the first input signal and second processing corresponding to the second input signal based on a determination result by the determination unit.

Further, according to an embodiment of the present disclosure, there is provided an input system including an operation input apparatus and an input signal receiving apparatus that receives an input signal from the operation input apparatus. The operation input apparatus includes a first operation receiving unit provided on a first surface of a housing, a second operation receiving unit provided on a second surface, which is different from the first surface, of the housing, an input signal receiving unit that receives a first input signal generated in accordance with an operation on the first operation receiving unit and a second input signal generated in accordance with the operation on the second operation receiving unit, and a determination unit that determines which surface of the first surface and the second surface is opposed to an operator of the operation input apparatus. The input signal receiving apparatus includes an input signal receiving unit that receives, from the operation input apparatus, the first input signal and the second input signal received by the input signal receiving unit, an opposing information receiving unit that receives, from the operation input apparatus, a determination result by the determination unit of which surface of the first surface and the second surface is opposed to the operator of the operation input apparatus, and a processing controller that changes one of first processing corresponding to the first input signal and second processing corresponding to the second input signal based on the received determination result.

Advantageous Effects of Invention

According to the present disclosure described above, desired processing can appropriately be performed when the user does an operation input using an operation input apparatus provided with operation receiving units on different surfaces.

BRIEF DESCRIPTION OF DRAWINGS

FIG. 3 is a diagram showing the configuration of a front side and a back side of the remote control apparatus.
FIG. 7 is a screen display example of recommending a method of holding the remote control apparatus to the user.
FIG. 8 shows examples of icons recommending the method of holding the remote control apparatus.
FIG. 9 is a diagram illustrating a recommendation display of the method of holding the remote control apparatus while a video player is being played back.
FIG. 10 is a diagram illustrating a recommendation display of the method of holding the remote control apparatus while a Web browser is being executed.
FIG. 11 is a diagram illustrating a recommendation display of widthways holding the remote control apparatus while game content is being executed.
FIG. 12 is a diagram illustrating a recommendation display of lengthways holding the remote control apparatus while game content is being executed.
FIG. 22 is a diagram showing a usage form of the remote control apparatus according to a third embodiment.
FIG. 30 is a diagram showing a first modification of a first operation receiving unit and a second operation receiving unit of the remote control apparatus.
FIG. 31 is a diagram showing a second modification of the first operation receiving unit and the second operation receiving unit of the remote control apparatus.
FIG. 32 is a diagram showing a third modification of the first operation receiving unit and the second operation receiving unit of the remote control apparatus.

DESCRIPTION OF EMBODIMENTS

Hereinafter, preferred embodiments of the present disclosure will be described in detail with reference to the appended drawings. Note that, in this specification and the drawings, elements that have substantially the same function and structure are denoted with the same reference signs, and repeated explanation is omitted.

In addition, description will be provided in the following order:
 1. First Embodiment
  1-1. Overview of Remote Control System
  1-2. Detailed Configuration of Remote Control Apparatus
  1-3. Detailed Configuration of TV Apparatus
  1-4. Operation of Remote Control Apparatus
  1-5. Operation of TV Apparatus 2. Second Embodiment
3. Third Embodiment
4. Fourth Embodiment
5. Fifth Embodiment
6. Other Embodiments <1. First Embodiment>

(1-1. Overview of Remote Control System)

Figure 1:
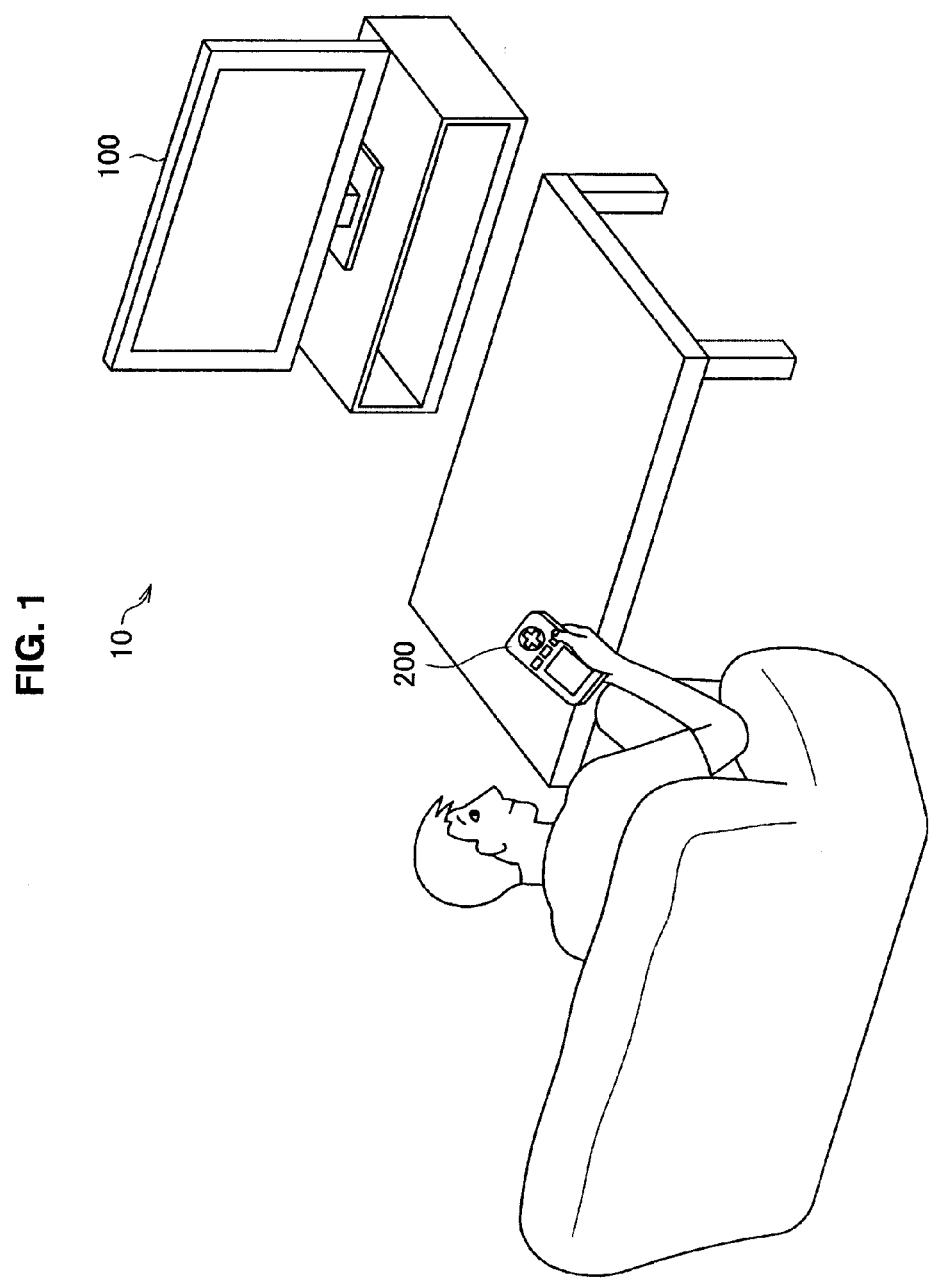
FIG. 1 is a diagram showing the configuration of a remote operation system according to a first embodiment.
Figure 2:
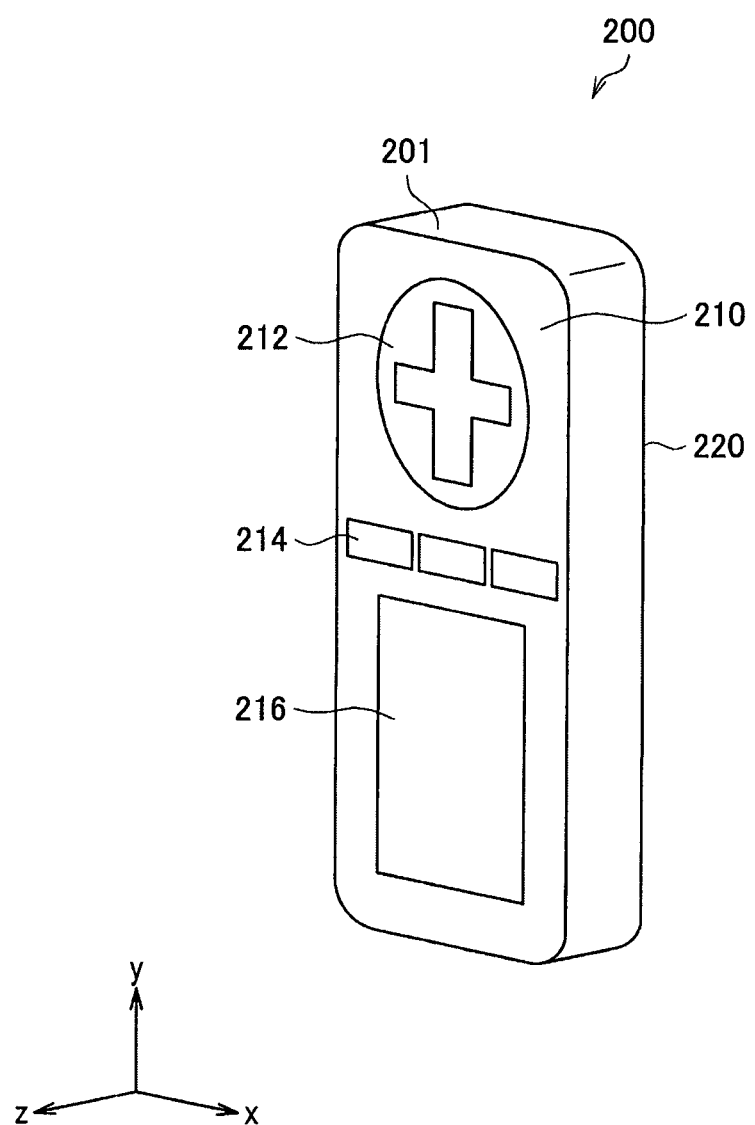
FIG. 2 is a perspective view showing an appearance of a remote control apparatus.

An overview of a remote operation system 10 as an input system of an input system according to the first embodiment will be provided with reference to FIGS. 1 to 3. FIG. 1 is a diagram showing the configuration of the remote operation system 10 according to the first embodiment. FIG. 2 is a perspective view showing the appearance of a remote control apparatus 200. FIG. 3 is a diagram showing the configuration of a front side 210 and a back side 220 of the remote control apparatus 200.

As shown in FIG. 1, the remote operation system 10 includes a TV apparatus 100 as an example of an input signal receiving apparatus and the remote control apparatus 200 as an example of an operation input apparatus.

The TV apparatus 100 is an apparatus to reproduce video and the like. The TV apparatus 100 reproduces video in accordance with an input operation accepted from the remote control apparatus 200. After, for example, a menu screen is displayed, the TV apparatus 100 also accepts an operation input on the menu screen from the remote control apparatus 200.

The remote control apparatus 200 is an apparatus to remotely control the TV apparatus 100. The remote control apparatus 200 communicates with the TV apparatus 100 using, for example, infrared-ray communication and transmits an operation signal corresponding to an operation input by the user to the TV apparatus 100.

As shown in FIG. 2, the remote control apparatus 200 has a rectangular housing 201 and an input unit is provided on each of the front side 210 (corresponding to a first surface) and the back side 220 (corresponding to a second surface) of the housing 201. That is, as shown in FIG. 3, a cross key unit 212, a button unit 214, and a touch pat unit 216 are provided on the front side 210. On the other hand, a keyboard unit 222 is provided on the back side 220, which is the opposite side of the front side 210. In the present embodiment, the cross key unit 212, the button unit 214, and the touch pat unit 216 constitute the first operation receiving unit and the keyboard unit 222 constitute the second operation receiving unit.

By providing the respective operation receiving units on the front side 210 and the back side 220 in this manner, various input methods can be realized while securing arrangement space of the operation receiving units without increasing the size of the housing 201 of the remote control apparatus 200. That is, the user can do an operation input by one of the cross key unit 212, the button unit 214, the touch pat unit 216, and the keyboard unit 222 by changing the way of holding the housing 201 (see FIG. 1) when operating the remote control apparatus 200.

For example, when an item on the menu screen of the display screen of the TV apparatus 100 should be selected, as shown in FIG. 1, the user holds the remote control apparatus 200 so that the front side 210 of the housing 201 is oriented toward the user and does input through the cross key unit 212 and the button unit 214 provided on the front side 210. When characters should be input, the user holds the remote control apparatus 200 so that the back side 220 of the housing 201 is oriented toward the user and does input through the keyboard unit 222 provided on the back side 220. Thus, the user performs a remote apparatus of the TV apparatus 100 in a desired input form by changing the method of holding the remote control apparatus 200.

Incidentally, when the operation receiving units (the first operation receiving unit and the second operation receiving unit) are provided on different surfaces (the front side 210 and the back side 220) of the housing 201 of the remote control apparatus 200, desired processing may not be performed by an input not intended by the user being done or an input being done erroneously. For example, when characters are input on the display screen of the TV apparatus 100 from the keyboard unit 222, the display screen may be switched by the button unit 214 being pressed erroneously.

Thus, the remote operation system 10 in the present embodiment performs the following processing so as to be able to perform desired processing appropriately when the user does input using the remote control apparatus 200 provided with input units on different surfaces. That is, while details thereof will be described later, the remote operation system 10 receives a first input signal generated in accordance with an operation on the first operation receiving unit and a second input signal generated in accordance with an operation on the second operation receiving unit. The remote operation system 10 also acquires opposing information indicating which surface of the front side 210 and back side 220 of the housing 201 is opposed to the user. Then, based on the acquired opposing information, the remote operation system 10 changes one of first processing in accordance with the first input signal and second processing in accordance with the second input signal.

If such a configuration is adopted, even if input is done by the first operation receiving unit and the second operation receiving unit provided on different surfaces, processing conforming to the opposing state of the remote control apparatus 200 to the user can be performed. Thus, for example, erroneous input by the user into the first operation receiving unit and the second operation receiving unit having mutually different operation receiving modes can be prevented and even if an erroneous input is done, the erroneous input can be changed into an appropriate input for processing. Therefore, usability when input is done into the remote control apparatus 200 provided with a plurality of operation receiving units can be improved.

(1-2. Detailed Configuration of Remote Control Apparatus)

Figure 4:
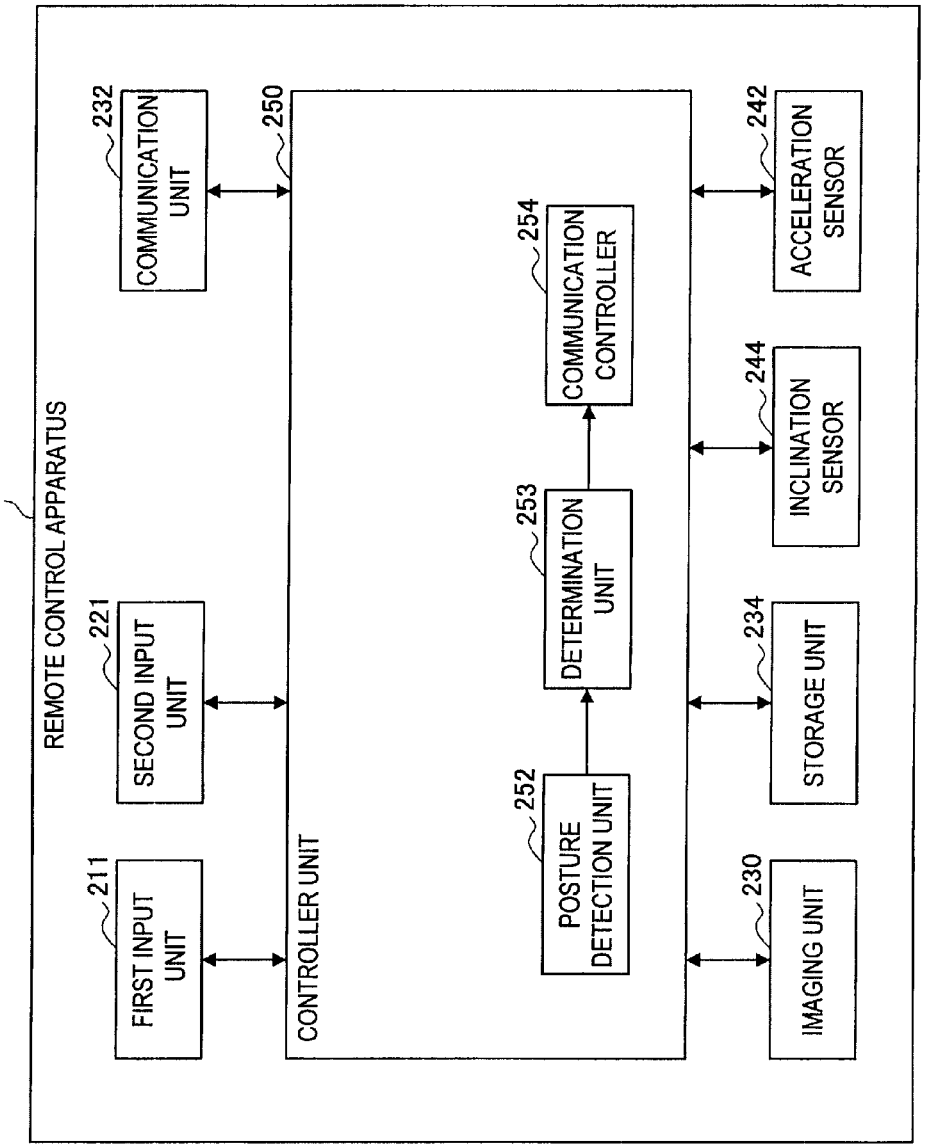
FIG. 4 is a block diagram showing a detailed configuration of the remote control apparatus.

A detailed configuration of the remote control apparatus 200 will be described with reference to FIG. 4. FIG. 4 is a block diagram showing a detailed configuration of the remote control apparatus 200.

As shown in FIG. 4, the remote control apparatus 200 includes a first input unit 211, a second input unit 221, an imaging unit 230, a communication unit 232, a storage unit 234, an acceleration sensor 242, an inclination sensor 244, and a controller unit 250.

The first input unit 211 and the second input unit 221 are used by the user as a user of the remote control apparatus 200 to do input for remote operation of the TV apparatus 100. The first input unit 211 generates a first input signal in accordance with an operation on the cross key unit 212, the button unit 214, or the touch pat unit 216 (first operation receiving unit) shown in FIG. 3. The second input unit 221 generates a second input signal in accordance with an operation on the keyboard unit 222 (second operation receiving unit) shown in FIG. 3. The keyboard unit 222 is configured by a plurality of keys (operation receiving member) arranged in different positions at predetermined intervals on the back side 220.

The imaging unit 230 has a function to capture an image of a subject. For example, the imaging unit 230 captures an image of the user when the user operates the remote control apparatus 200. Image data captured by the imaging unit 230 is subjected to image processing and the like before being sent to the controller unit 250. The imaging unit 230 is configured by an imaging apparatus such as a camera having a lens and an image sensor. The imaging unit 230 is provided, for example, on each of the front side 210 and the back side 220 of the housing 201. If such a configuration is adopted, which surface of the front side 210 and the back side 220 is opposed to the user can be determined by detecting the user by the imaging unit 230. Incidentally, the imaging unit 230 may be provided one of the front side 210 and the back side 220.

The communication unit 232 is a communication interface having functions of a transmitting unit and a receiving unit that communicates with the TV apparatus 100 based on the control of the controller unit 250. The communication unit 232 transmits remote operation information and the like of the TV apparatus 100 corresponding to input by the first input unit 211 and the second input unit 221 to the TV apparatus 100. The communication unit 232 is configured by, for example, a communication apparatus for infrared-ray communication or Bluetooth.

The storage unit 234 has a function to store various kinds of information used by the controller unit 250. For example, the storage unit 234 stores image data captured by the imaging unit 230. The storage unit 234 is configured by a storage device such as a magnetic storage device, semiconductor storage device, or optical storage device.

The acceleration sensor 242 is used to measure 3-axis (the x axis, y axis, and z axis shown in FIG. 2) acceleration of the remote control apparatus 200. The inclination sensor 244 is a gyro sensor that measures an inclination of the remote control apparatus 200. Measurement results by the acceleration sensor 242 and the inclination sensor 244 are sent to the controller unit 250.

The controller unit 250 has a function to control the overall operation of the remote control apparatus 200 and controls the operation of the remote control apparatus 200 based on, for example, operation information output from the first input unit 211 or the second input unit 221. The controller unit 250 is configured by a CPU, ROM, and RAM.

As shown in FIG. 4, the controller unit 250 includes a posture detection unit 252, a determination unit 253, and a communication controller 254.

The posture detection unit 252 detects the posture of the remote control apparatus 200 based on measurement results of the acceleration sensor 242 and the inclination sensor 244. The posture detection unit 252 continuously detects the posture of the remote control apparatus 200 based on measurement results output in a predetermined sampling period when the user operates the remote control apparatus 200.

The determination unit 253 determines which surface of the front side 210 and the back side 220 of the housing 201 is opposed to the user of the remote control apparatus 200 based on detection results by the posture detection unit 252 or detection results by the imaging unit 230 (front/back determination). The determination unit 253 can also determine the orientation (widthways or lengthways) of the front side 210 of the remote control apparatus 200 based on detection results by the posture detection unit 252 or detection results by the imaging unit 230 (length/width determination).

The determination processing by the determination unit 253 will concretely be described with reference to FIG. 5.

Figure 5:
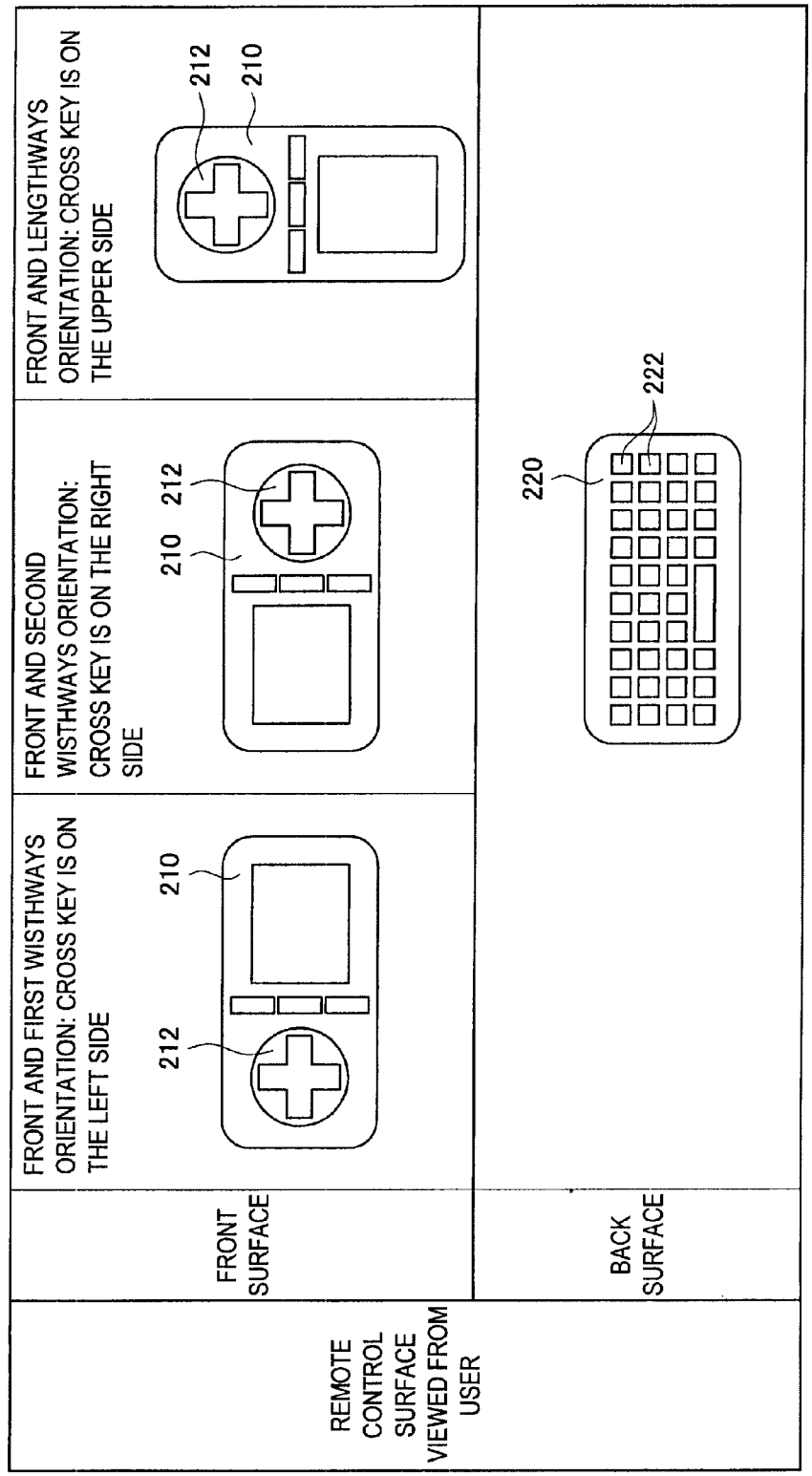
FIG. 5 is a diagram illustrating surfaces of the remote control apparatus that can be determined by a determination unit.

FIG. 5 is a diagram illustrating surfaces of the remote control apparatus 200 that can be determined by the determination unit 253.

When the front side 210 on which the cross key unit 212 is provided is opposed to the user, the determination unit 253 determines that the front side 210 is the front surface in the front/back determination. Similarly, when the back side 220 on which the keyboard unit 222 is provided is opposed to the user, the determination unit 253 determines that the back side 220 is the back surface in the front/back determination.

The determination unit 253 also determines the widthways orientation or the lengthways orientation of the front side 210 when the front side 210 is opposed to the user. In the present embodiment, there are two widthways orientations determined by the determination unit 253. More specifically, as shown in FIG. 5, a first widthways orientation is a state in which the cross key unit 212 is positioned on the left side and a second widthways orientation is a state in which the cross key unit 212 is positioned on the right side. The lengthways orientation in the present embodiment is a state in which the cross key unit 212 is positioned on the upper side.

The description will continue by returning to FIG. 4. The communication controller 254 controls communication with the TV apparatus 100 by the communication unit 232. For example, the communication controller 254 controls the communication unit 232 to transmit remote operation information of the TV apparatus 100 corresponding to an input signal generated by the first input unit 211 or the second input unit 221 and determination result information (also called opposing information) by the determination unit 253 to the TV apparatus 100.

(1-3. Detailed Configuration of TV Apparatus)

Figure 6:
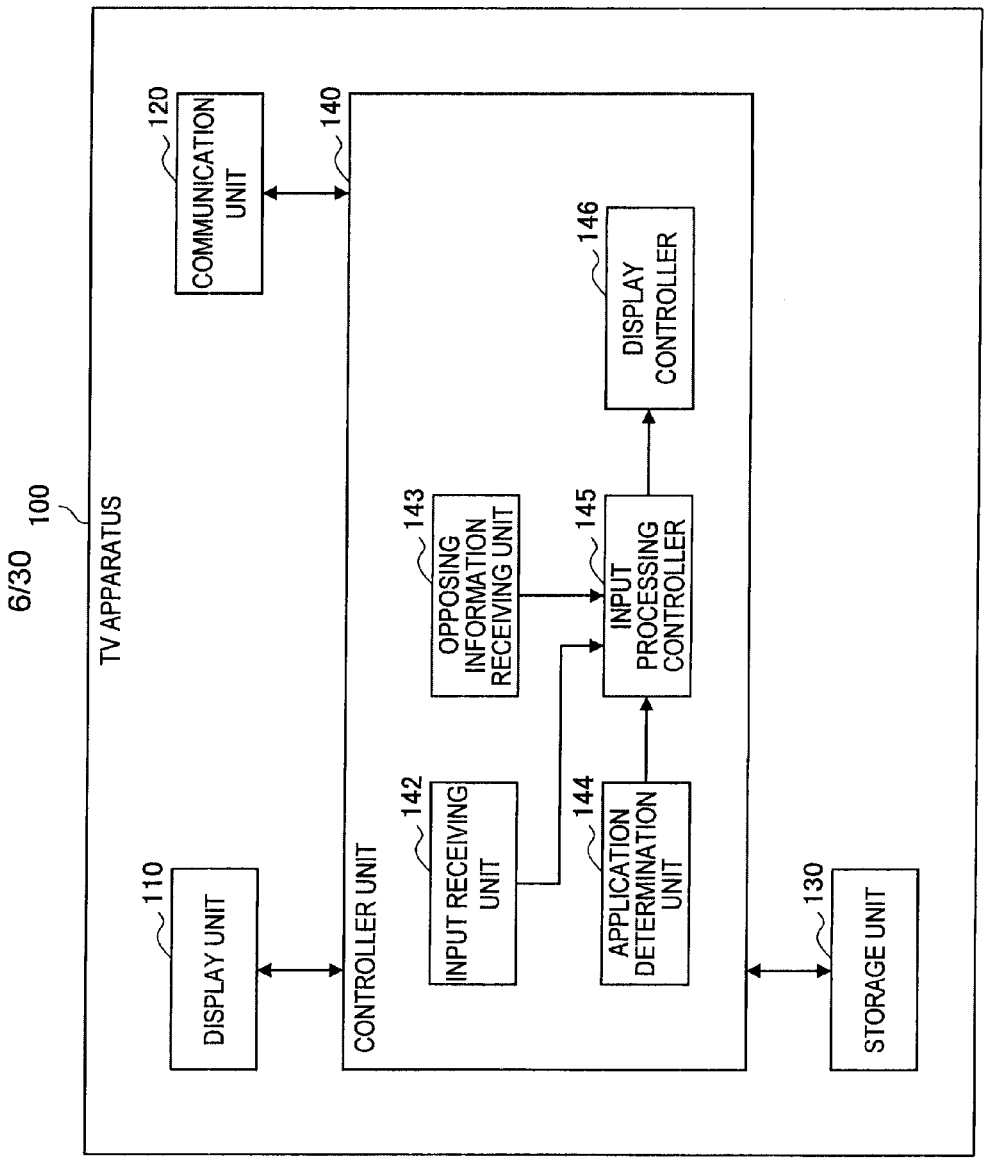
FIG. 6 is a block diagram showing the detailed configuration of a TV apparatus.

A detailed configuration of the TV apparatus 100 will be described with reference to FIG. 6. FIG. 6 is a block diagram showing the detailed configuration of the TV apparatus 100.

As shown in FIG. 6, the TV apparatus 100 includes a display unit 110, a communication unit 120, a storage unit 130, and a controller unit 140.

The display unit 110 has a function to display various kinds of information based on the control by the controller unit 140. For example, the display unit 110 displays reproduced video and the like. The display unit 110 is configured by a display apparatus such as a liquid crystal display, plasma display, or organic EL display.

The communication unit 120 is a communication interface having functions of a transmitting unit and a receiving unit that communicate with the remote control apparatus 200 based on the control of the controller unit 140. The communication unit 120 receives remote operation information transmitted from the remote control apparatus 200 and information about determination results (also called user opposed direction determination results) by the determination unit 253. The communication unit 120 is configured by, for example, a communication apparatus for infrared-ray communication or Bluetooth.

The storage unit 130 has a function to store various kinds of information used by the controller unit 140. For example, the storage unit 130 stores determination results by the determination unit 253 received by the communication unit 120. The storage unit 130 is configured by a storage device such as a magnetic storage device, semiconductor storage device, or optical storage device.

The controller unit 140 has a function to control the overall operation of the TV apparatus 100 and can control the operation of the TV apparatus 100 based on, for example, remote operation information received by the communication unit 120. The controller unit 140 is configured by a CPU, ROM, and RAM.

As shown in FIG. 6, the controller unit 140 includes an input receiving unit 142 as an example of an input signal receiving unit, an opposing information receiving unit 143 as an example of an opposing information acquisition unit, an application determination unit 144, an input processing controller 145, and a display controller 146.

The input receiving unit 142 receives a first input signal generated by the first input unit 211 of the remote control apparatus 200 and a second input signal generated by the second input unit 221 based on remote operation information received via the communication unit 120. Each time at least one of the first input unit 211 and the second input unit 221 generates an input signal, the input receiving unit 142 receives an input signal from the remote control apparatus 200. The input receiving unit 142 outputs the received input signal to the input processing controller 145.

The opposing information receiving unit 143 receives information about a determination result by the determination unit 253 received via the communication unit 120. Accordingly, the opposing information receiving unit 143 acquires opposing information indicating which surface of the front side 210 and the back side 220 of the remote control apparatus 200 is opposed to the user and orientation information about the orientation of the housing 201. The opposing information receiving unit 143 outputs the acquired opposing information and orientation information to the input processing controller 145.

The application determination unit 144 determines the application being executed in the TV apparatus 100. The TV apparatus 100 can execute, for example, a video player, Web browser, and game content as applications. The application determination unit 144 determines which application of these applications is being executed.

The input processing controller 145 changes one of first processing corresponding to a first input signal output from the input receiving unit 142 and second processing corresponding to a second input signal output based on opposing information output from the opposing information receiving unit 143. Accordingly, even if input by an operation receiving unit provided on a different surface of the remote control apparatus 200 is done, processing conforming to an opposing state to the user of the remote control apparatus 200 can be performed.

The input processing controller 145 can perform the first processing and also disable a portion of the second processing when the front side 210 is opposed to the user according to the acquired opposing information and can perform the second processing and also disable a portion of the first processing when the back side 220 is opposed to the user. Accordingly, even if erroneous input by an operation receiving unit provided on the surface side not opposed to the user or an input not intended by the user is done, an erroneous operation of the TV apparatus 100 can be prevented by disabling processing.

The input processing controller 145 receives information about the application being executed from the application determination unit 144 and can disable processing corresponding to input by an operation receiving member positioned in a predetermined position in accordance with the application being executed. Accordingly, processing corresponding to input by an operation receiving member (for example, a specific key of the keyboard unit 222) located in a position where erroneous input is more likely to occur can effectively be prevented and also input by an operation receiving member (key) located in another position can be enabled.

As a result, various kinds of input can be done by making effective use of both of the first operation receiving unit and the second operation receiving unit.

The input processing controller 145 controls the first processing and the second processing for the application being executed among a plurality of applications. Then, the input processing controller 145 sets a portion of the second processing to be disabled in accordance with the application being executed when the front side 210 is opposed to the user in the acquired opposing information. Accordingly, input to the application being executed by the first operation receiving unit and the second operation receiving unit is enabled and also various kinds of input to the application being executed can be done by limiting input to be disabled.

The input processing controller 145 may perform the first processing and also disable all of the second processing when the front side 210 is opposed to the user and may perform the second processing and also disable all of the first processing when the back side 220 is opposed to the user. Accordingly, erroneous input by an operation receiving unit provided on the back side 220 of the remote control apparatus 200 can reliably be prevented.

The input processing controller 145 can detect switching of the surface of the remote control apparatus 200 opposed to input between the front side 210 and the back side 220. Then, when switching is detected, the input processing controller 145 disables all processing on input signals generated by the first input unit 211 and the second input unit 221 when switched. For example, when the user turns over and changes the way of holding the remote control apparatus 200 (in such a case, the surface opposed to the user is switched between the front side 210 and the back side 220 of the remote control apparatus 200), the input processing controller 145 disables input during the operation. Accordingly, even if the user does erroneous input into the first operation receiving unit or the second operation receiving unit while changing the way of holding the remote control apparatus 200, an erroneous operation of the application can be prevented.

The input processing controller 145 changes one of the first processing and the second processing based on acquired opposing information and orientation information. For example, the input processing controller 145 changes the coordinate axis indicating the operation direction of an operation received by an operation receiving unit based on opposing information and orientation information. Then, the input processing controller 145 changes a first input signal (or a second input signal) generated by the first input unit 211 (or the second input unit 221) to a signal corresponding to the changed coordinate axes for processing. Accordingly, even if a back-side operation by the touch pad unit 216 or the cross key unit 212 provided on the surface on the opposite side of the surface opposed to the user is performed, a changing is carried out in the direction when a front operation is performed.

The changing of the coordinate axes will be described here. Between the front-side operation and the back-side operation, the coordinate axis in the y axis direction (up and down direction) shown in FIG. 2 is reversed and the coordinate axis in the x axis direction (left and right direction) shown is reversed and thus, the coordinate axes are changed so as to correspond to such reversals. As a result, appropriate input can be done regardless of the side of the remote control apparatus 200. The reversals of the up and down direction and the left and right direction are determined by the determination unit 253 based on measurements results by the acceleration sensor 242 and the inclination sensor 244 of the remote control apparatus 200.

The display controller 146 controls the display of the display unit 110. For example, the display controller 146 switches the screen display in accordance with control by the input processing controller 145. The display controller 146 can display the recommendation display (details will be described later) of the method of holding the remote control apparatus 200 in the display unit 110. Accordingly, the user can visually recognize the optimum way of holding the remote control apparatus 200.

(Determination of Whether the Way of Holding the Remote Control Apparatus is Changed)

The method of determining whether the user changes the way of holding the remote control apparatus 200 during operation of the remote control apparatus 200 will be described by citing three examples.

In the first example, whether the user changes the way of holding the remote control apparatus 200 can be determined by using the front/back discrimination (that is, measurements results of the acceleration sensor 242 of the remote control apparatus 200) of the remote control apparatus 200 described above. Details of the front/back discrimination will be described later.

In the second example, the determination can be made by using the inclination sensor 244 of the remote control apparatus 200. If, for example, the rotation angle of a predetermined angle or more is detected within a predetermined time around the x axis or the y axis of the remote control apparatus 200 shown in FIG. 2, the user is determined to have changed the way of holding the remote control apparatus 200 by turning the front side 210 or the back side 220 over.

In the third example, the recommendation display of the method of holding the remote control apparatus 200 described later is combined. The time until a front/back state change of the remote control apparatus 200 is detected within a predetermined time in which the recommendation display is made is considered as a time needed to change the way of holding the remote control apparatus 200 and input by the input unit in the meantime is disabled.

(Recommendation Display of the Method of Holding the Remote Control Apparatus)

The recommendation display of the method of holding the remote control apparatus 200 will be described. In the present embodiment, the most appropriate method of holding the remote control apparatus 200 in accordance with the state change inside the application being executed is displayed as figures or characters on the screen of the TV apparatus 100.

It is assumed here that the method of holding the remote control apparatus 200 appropriate to the application state is preset. If the current method of holding the remote control apparatus 200 by the user is not appropriate to the application, the screen display shown in FIG. 7 is made for a predetermined time to recommend an appropriate holding method to the user.

FIG. 7 is a screen display example of recommending a method of holding the remote control apparatus 200 to the user. In FIG. 7, an icon (figure) and a sentence indicating an appropriate method of holding the remote control apparatus 200 are shown. The user viewing the screen display (icon showing the keyboard) of FIG. 7 changes the method of holding the remote control apparatus 200 from the state in which the front side 210 is opposed to the user to the state in which the back side 220 is opposed to the user. In the screen display of FIG. 7, one of four icons shown in FIG. 8 is displayed. The methods of holding the remote control apparatus 200 indicated by the four icons correspond to states of the remote control apparatus 200 shown in FIG. 5 described above. Incidentally, FIG. 8 shows examples of icons recommending the method of holding the remote control apparatus 200.

The predetermined time during which the screen display of the method of holding the remote control apparatus 200 is made can be set by the user. The screen display may be faded out by associating with the remaining time or the remaining time may be displayed on the screen so that the user knows the remaining time of screen display.

When the determination unit 253 of the remote control apparatus 200 determines that the user changes to the state of the recommended method (state in which the back side 220 is opposed to the user) while the screen display shown in FIG. 7 is made, the TV apparatus 100 ends the display showing the recommended holding method. Then, the TV apparatus 100 displays a message that the user's holding method is changed on the screen.

On the other hand, the state does not correspond to the recommended holding method and a predetermined number of continuous inputs or more by the remote control apparatus 200 occur while the screen display shown in FIG. 7 is made, the recommendation display is terminated by displaying a message that the method of holding the remote control apparatus 200 is not changed on the screen.

(Recommendation Display in Accordance with the Application and Input Processing Control)

The recommendation display in accordance with the application and input processing control will be described below by citing three examples.

First, a case when a Web search is performed while viewing a video player will be described. While viewing a video player, the user normally holds the remote control apparatus 200 lengthways and does input using an operation receiving unit on the opposed front side 210.

FIG. 9 is a diagram illustrating the recommendation display of the method of holding the remote control apparatus 200 while a video player is being played back. If the user presses the Web search button while viewing video, a search window is displayed by being superimposed on content being viewed. At this point, the recommendation display of the holding method of the remote control apparatus 200 such that the back side 220 provided with the keyboard unit 222 is opposed to the user is made (see a screen 911 in FIG. 9). This is because text input for the Web search is easier if the keyboard unit 222 opposed to the user is used.

If the method of holding the remote control apparatus 200 is changed (that is, the back side 220 of the remote control apparatus 200 is opposed to the user) after the recommendation display, a message that the holding method is changed is displayed on the screen and the input processing controller 145 exercises the following control.

That is, the input processing controller 145 disables input by the remote control apparatus 200 while the way of holding the remote control apparatus 200 is changed. Accordingly, an erroneous operation by an unintended input while the way of holding the remote control apparatus 200 is changed can be prevented. If the way of holding the remote control apparatus 200 is changed, input from the keyboard unit 222 is enabled while input from the cross key unit 212 and the button unit 214 on the front side 210 is disabled. Accordingly, an erroneous input by the cross key unit 212 and the button unit 214 can be prevented. Incidentally, input from the touch pad unit 216 on the front side 210 is enabled. When a back-side input from the touch pad unit 216 is done, the input processing controller 145 performs data processing corresponding to the changing of coordinate axes of the touch pad (reversals of coordinate axes of the x axis and the y axis in FIG. 2).

Accordingly, the user can perform a free cursor operation by the back-side operation or a gesture input on a touch pad.

If the method of holding the remote control apparatus 200 is not changed (that is, the state in which the front side 210 is opposed is maintained), the user does input using the cross key unit 212 and the button unit 214 on the front side 210.

When the Web search is completed, as shown on a screen 912 of FIG. 9, the recommendation display to switch to the front side 210 provided with the cross key unit 212 and the button unit 214 is made. If the method of holding the remote control apparatus 200 is changed (that is, the front side 210 of the remote control apparatus 200 is opposed to the user) after the recommendation display, a message that the holding method is changed is displayed on the screen and the input processing controller 145 exercises the following control.

That is, the input processing controller 145 disables input by the remote control apparatus 200 while the way of holding the remote control apparatus 200 is changed so as to prevent an erroneous operation by an unintended input while the way of holding the remote control apparatus 200 is changed. If the method of holding the remote control apparatus 200 is changed, input from the cross key unit 212, the button unit 214, and the touch pad unit 216 on the front side 210 is enabled while input from the keyboard unit 222 on the back side 220 positioned on the opposite side when viewed from the user. Accordingly, an erroneous input by the keyboard unit 222 can be prevented.

Next, a case of a Web browser application will be described. During Web browsing, for example, the user uses the touch pad unit 216 on the opposed front side 210 to perform a free cursor operation in HTML content.

FIG. 10 is a diagram illustrating the recommendation display of the method of holding the remote control apparatus 200 while a Web browser is being executed. When, as shown on a screen 921 of FIG. 10, a text input field in HTML content is selected by the free cursor, as shown on a screen 922, the recommendation display of the method of holding the remote control apparatus 200 such that the back side 220 is opposed to the user is made. This is because text input is easier if the keyboard unit 222 on the back side 220 opposed to the user is used.

If the method of holding the remote control apparatus 200 is changed (that is, the back side 220 of the remote control apparatus 200 is opposed to the user) after the recommendation display, a message that the holding method is changed is displayed on the screen and the input processing controller 145 exercises the following control.

That is, the input processing controller 145 disables input by the remote control apparatus 200 while the way of holding the remote control apparatus 200 is changed so as to prevent an erroneous operation by an unintended input while the way of holding the remote control apparatus 200 is changed. If the method of holding the remote control apparatus 200 is changed, input from the keyboard unit 222 is enabled while input from the cross key unit 212 and the button unit 214 on the front side 210 is disabled. Accordingly, an erroneous input by the cross key unit 212 and the button unit 214 can be prevented. Incidentally, input from the touch pad unit 216 on the front side 210 is enabled. Accordingly, the user can perform a free cursor operation by the back-side operation or a gesture input on a touch pad.

The control of the input processing controller 145 when text input is completed is similar to, as described using the screen 912 of FIG. 9, the control when the Web search in a video player is completed and thus, a description thereof is omitted here.

Next, a case of game content will be described. In the case of game content, the user is likely to change the method of holding the remote control apparatus 200 in accordance with the state of content. Because a change of the method of holding the front side/back side of the remote control apparatus 200 is similar to the case of a video player or Web browser, recommendation displays of holding the remote control apparatus 200 widthways or lengthways will be described below.

FIG. 11 is a diagram illustrating the recommendation display of widthways holding the remote control apparatus 200 while game content is being executed. FIG. 12 is a diagram illustrating the recommendation display of lengthways holding the remote control apparatus 200 while game content is being executed. The x axis and the y axis shown in FIGS. 11 and 12 show touch pad coordinates of the touch pad unit 216 and coordinate orientations are different when the remote control apparatus 200 is held widthways and lengthways.

Here, content for which the remote control apparatus 200 is suitably held widthways and content for which the remote control apparatus 200 is suitably held lengthways are preset. If the holding method preset for the content being executed and the method of currently holding the remote control apparatus 200 are different, as shown in FIGS. 11 and 12, the recommendation display of lengthways or widthways holding the remote control apparatus 200 is made. For example, if, when certain content is switched to other content, the method of holding the remote control apparatus 200 corresponding to the switched content is not adopted, the recommendation display corresponding to the switched content is made.

If the method of holding the remote control apparatus 200 is changed after the recommendation display, a message that the holding method is changed is displayed on the screen. Then, the input processing controller 145 performs data processing corresponding to the changing of coordinate axes when input is done from the touch pad unit 216. Accordingly, as shown in FIGS. 11 and 12, even if the orientation of touch pad coordinates is changed, the user can use the touch pad unit 216 without being aware thereof.

(1-4. Operation of Remote Control Apparatus)

Figure 13:
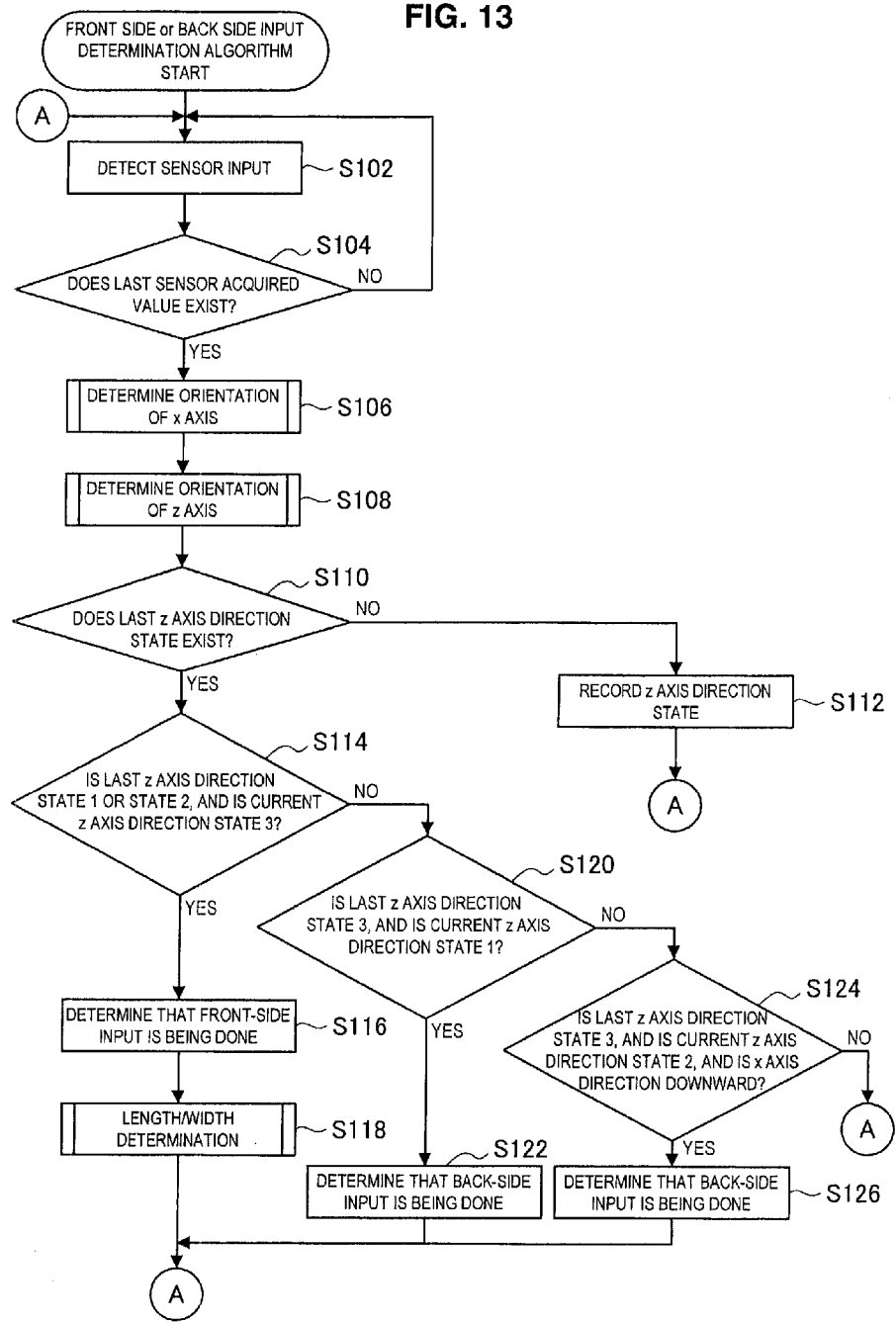
FIG. 13 is a flow chart showing an operation example of the remote control apparatus.

An operation example of the remote control apparatus 200 when the front/back determination processing of the remote control apparatus 200 is performed will be described with reference to FIG. 13. FIG. 13 is a flow chart showing an operation example of the remote control apparatus 200. The flow chart in FIG. 13 starts when the user holds the remote control apparatus 200 in his hand to perform a remote operation of the TV apparatus 100.

The present processing is realized by a program stored in the ROM being executed by the CPU of the controller unit 250 of the remote control apparatus 200. Incidentally, the program to be executed may be recorded in a recording medium such as a CD (Compact Disk), DVD (Digital Versatile Disk), and a memory card or downloaded from a server via the Internet.

First, the posture detection unit 252 of the controller unit 250 acquires a measurement result (sensor acquired value) by the acceleration sensor 242 (step S102). Next, the posture detection unit 253 determines whether the sensor acquired value of last time exists (step S104).

If no sensor acquired value of last time exists in step S104 (No), the posture detection unit 253 acquires a sensor acquired value after a predetermined time (after a sampling frequency) (step S102). On the other hand, if the sensor acquired value of last time exists in step S104 (Yes), the posture detection unit 253 makes an orientation determination of the x axis and an orientation determination of the z axis of the remote control apparatus 200 (steps S106, S108).

Orientation determination processing of the x axis and orientation determination processing of the z axis of the remote control apparatus 200 will be described with reference to FIGS. 14 and 15.

Figure 14:
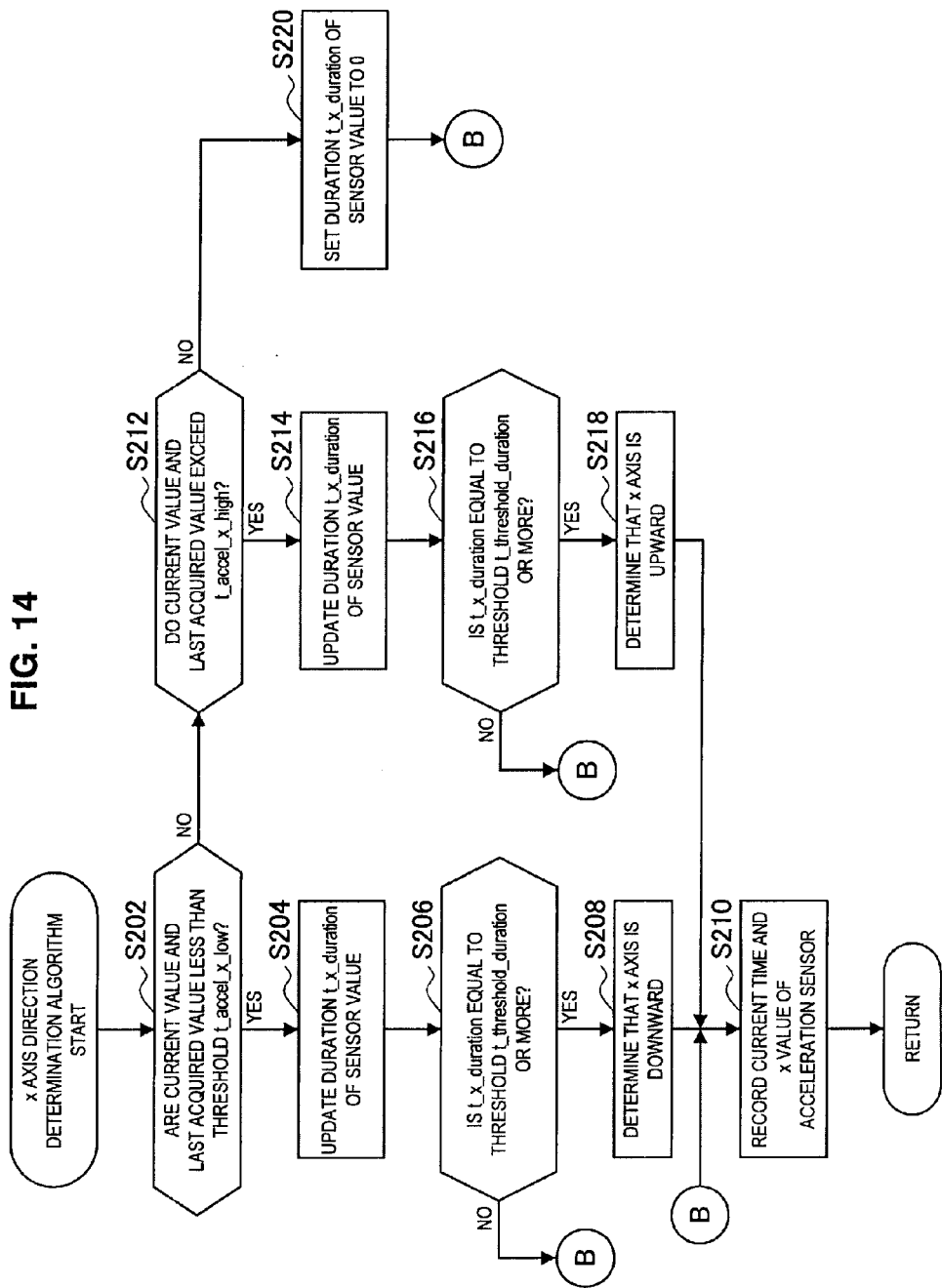
FIG. 14 is a flow chart showing orientation determination processing of the x axis.

FIG. 14 is a flow chart showing orientation determination processing of the x axis. First, the posture detection unit 252 determines whether the sensor value of the x axis acquired this time and the sensor value of the x axis acquired last time are less than a threshold x_low (step S202). If the sensor values of the x axis are determined to be less than the threshold x_low in step S202 (Yes), the posture detection unit 252 updates the duration of the sensor value (step S204).

Next, the posture detection unit 252 determines whether the duration of the sensor value after the update is equal to a threshold or more (step S206). If the duration of the sensor value is determined to be equal to the threshold or more in step S206 (Yes), the posture detection unit 252 determines that the x axis of the remote control apparatus 200 is oriented downward (step S208). That the x axis is oriented downward means that the positive orientation (see FIG. 2) of the x axis is downward.

Next, the posture detection unit 252 records the current time and the X value of the acceleration sensor 242 (step S210). On the other hand, if the duration of the sensor value is determined to be less than the threshold in step S206 (No), the posture detection unit 252 performs processing in step S210 without identifying the orientation of the x axis.

If the sensor values are determined to be equal to the threshold x_low or more in step S202 (No), the posture detection unit 252 determines whether the sensor value acquired this time and the sensor value acquired last time exceed a threshold x_high (whose value is greater than the threshold x_low) (step S212). If the sensor values of the x axis are determined to exceed the threshold x_high in step S212 (Yes), the posture detection unit 252 updates the duration of the sensor value (step S214).

Next, the posture detection unit 252 determines whether the duration of the sensor value after the update is equal to a threshold or more (step S216). If the duration of the sensor value is determined to be equal to the threshold or more in step S216 (Yes), the posture detection unit 252 determines that the positive orientation of the x axis of the remote control apparatus 200 is oriented upward (step S218). Next, the posture detection unit 252 performs processing in step S210. On the other hand, if the duration of the sensor value is determined to be less than the threshold in step S216 (No), the posture detection unit 252 performs processing in step S210 without identifying the orientation of the x axis.

If the sensor values of the x axis are determined to be equal to the threshold x_high or less in step S212 (No), the posture detection unit 252 sets the duration of the sensor value to 0 (step S220). Then, the posture detection unit 252 performs processing in step S210. This completes the orientation determination processing of the x axis.

Figure 15:
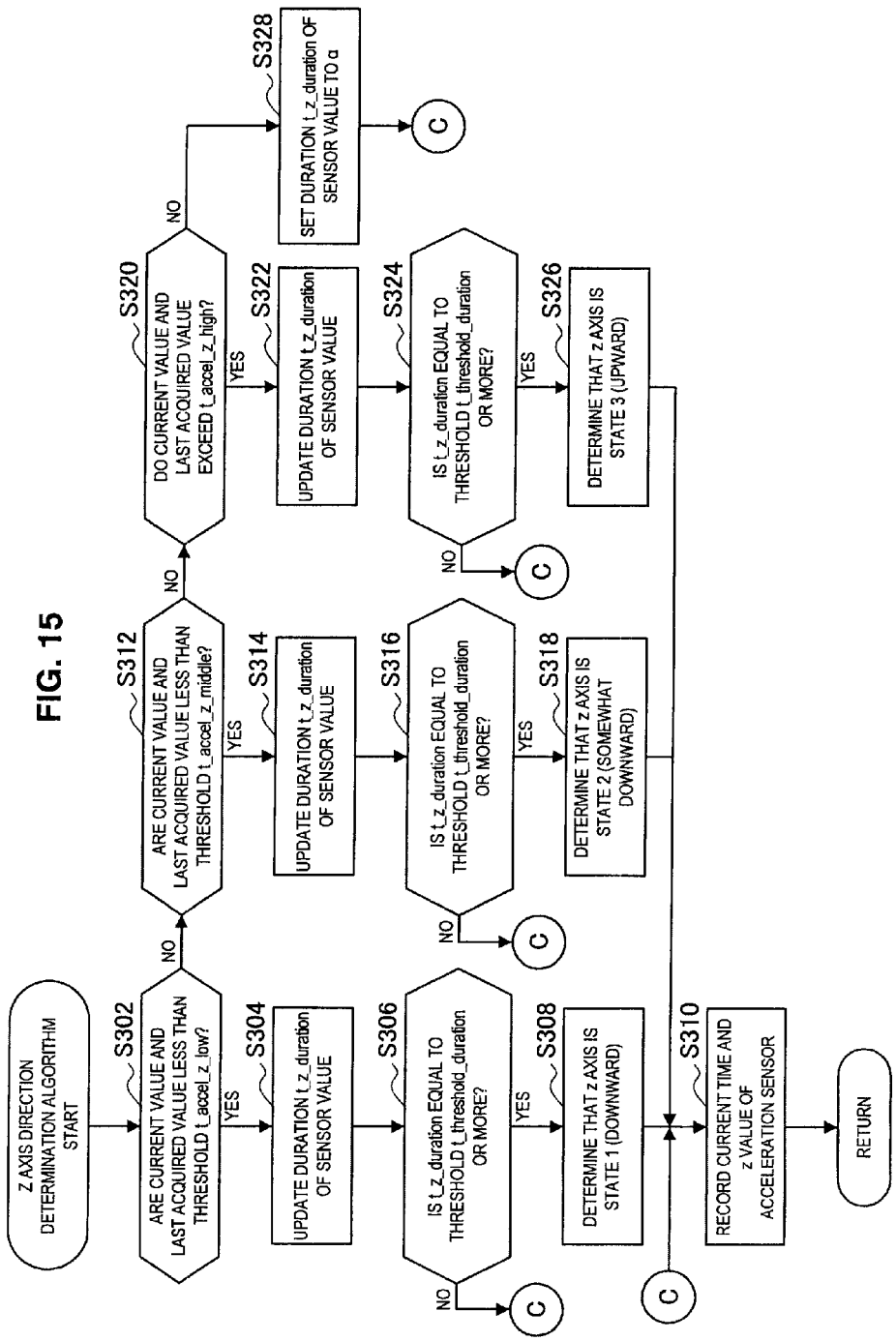
FIG. 15 is a flow chart showing the orientation determination processing of the z axis.

FIG. 15 is a flow chart showing the orientation determination processing of the z axis. First, the posture detection unit 252 determines whether the sensor value of the z axis acquired this time and the sensor value of the z axis acquired last time are less than a threshold z_low (step S302). If the sensor values of the z axis are determined to be less than the threshold z_low in step S302 (Yes), the posture detection unit 252 updates the duration of the sensor value (step S304).

Next, the posture detection unit 252 determines whether the duration of the sensor value after the update is equal to a threshold or more (step S306). If the duration of the sensor value is determined to be equal to the threshold or more in step S306 (Yes), the posture detection unit 252 determines that the z axis of the remote control apparatus 200 is oriented downward (state 1) (step S308). That the z axis is oriented downward means that the positive orientation (see FIG. 2) of the z axis is downward.

Next, the posture detection unit 252 records the current time and the Z value of the acceleration sensor 242 (step S310). On the other hand, if the duration of the sensor value is determined to be less than the threshold in step S306 (No), the posture detection unit 252 performs processing in step S310 without identifying the orientation of the z axis.

If the sensor values are determined to be equal to a threshold z_middle or more in step S302 (No), the posture detection unit 252 determines whether the sensor values are less than the threshold z_middle (whose value is greater than the threshold z_low) (step S312). If the sensor values of the z axis are determined to be less than the threshold z_middle in step S312 (Yes), the posture detection unit 252 updates the duration of the sensor value (step S314).

Next, the posture detection unit 252 determines whether the duration of the sensor value after the update is equal to a threshold or more (step S316). If the duration of the sensor value is determined to be equal to the threshold or more in step S316 (Yes), the posture detection unit 252 determines that the positive orientation of the z axis of the remote control apparatus 200 is oriented somewhat downward (state 2) (step S318). Next, the posture detection unit 252 performs processing in step S310. On the other hand, if the duration of the sensor value is determined to be less than the threshold in step S316 (No), the posture detection unit 252 performs processing in step S310 without identifying the orientation of the z axis.

If the sensor values are determined to be equal to the threshold z_middle or more in step S312 (No), the posture detection unit 252 determines whether the sensor values exceed a threshold z_high (whose value is greater than the threshold z_middle) (step S320). If the sensor values of the z axis are determined to exceed the threshold z_high in step S320 (Yes), the posture detection unit 252 updates the duration of the sensor value (step S322).

Next, the posture detection unit 252 determines whether the duration of the sensor value after the update is equal to a threshold or more (step S324). If the duration of the sensor value is determined to be equal to the threshold or more in step S324 (Yes), the posture detection unit 252 determines that the z axis of the remote control apparatus 200 is oriented upward (state 3) (step S326). Next, the posture detection unit 252 performs processing in step S210. On the other hand, if the duration of the sensor value is determined to be less than the threshold in step S324 (No), the posture detection unit 252 performs processing in step S310 without identifying the orientation of the z axis.

If the sensor values of the z axis are determined to be equal to the threshold z_high or less in step S320 (No), the posture detection unit 252 sets the duration of the sensor value to 0 (step S328). Then, the posture detection unit 252 performs processing in step S310. This completes the orientation determination processing of the z axis before returning to the flow chart in FIG. 13.

When the orientation determination processing of the z axis in step S108 of FIG. 13 is completed, the determination unit 253 determines whether the state in the z axis direction of last time exists (step S110). That is, the determination unit 253 determines whether any of the state of the z axis oriented downward (state 1), the state of the z axis oriented somewhat downward (state 2), and the state of the z axis oriented upward (state 3) of last time exists. If the state in the z axis direction of last time is determined not to exist in step S110 (No), the processing in step S102 and thereafter is repeated.

On the other hand, if the state in the z axis direction of last time is determined to exist in step S110 (Yes), the determination unit 253 determines whether the state in the z axis direction of last time is state 1 or state 2, and the state in the z axis direction of this time is state 3 (S 114). If it is determined in step S114 that the state in the z axis direction of last time is state 1 or state 2, and the state in the z axis direction of this time is state 3 (No), the determination unit 253 determines that the user doing input on the front side of the remote control apparatus 200 (step S116). That is, it is determined that by making the transition from state 1 or state 2 in which the back side 220 of the remote control apparatus 200 is opposed to the user to state 3 in which the front side 210 is opposed to the user, the user changes the way of holding the remote control apparatus 200 to do input on the front side using the first input unit 211 of the front side 210.

If the conditions in step S114 are not satisfied (No), the determination unit 253 determines whether the state in the z axis direction of last time is state 3 and the state in the z axis direction of this time is state 1 (step S120). If the conditions in step S120 are satisfied (Yes), the determination unit 253 determines that the user is doing input on the back side of the remote control apparatus 200 (step S122). That is, it is determined that by making the transition from state 3 in which the front side 210 of the remote control apparatus 200 is opposed to the user to state 1 in which the back side 220 is opposed to the user, the user changes the way of holding the remote control apparatus 200 to do input on the back side using the second input unit 221 of the front side 210.

If the conditions in step S120 are not satisfied (No), the determination unit 253 determines whether the state in the z axis direction of last time is state 3 and the state in the z axis direction of this time is state 2 and the x axis direction is oriented downward (step S124). If the conditions in step S124 are satisfied (Yes), the determination unit 253 determines that the user is doing input on the back side of the remote control apparatus 200 (step S126).

Figure 16:
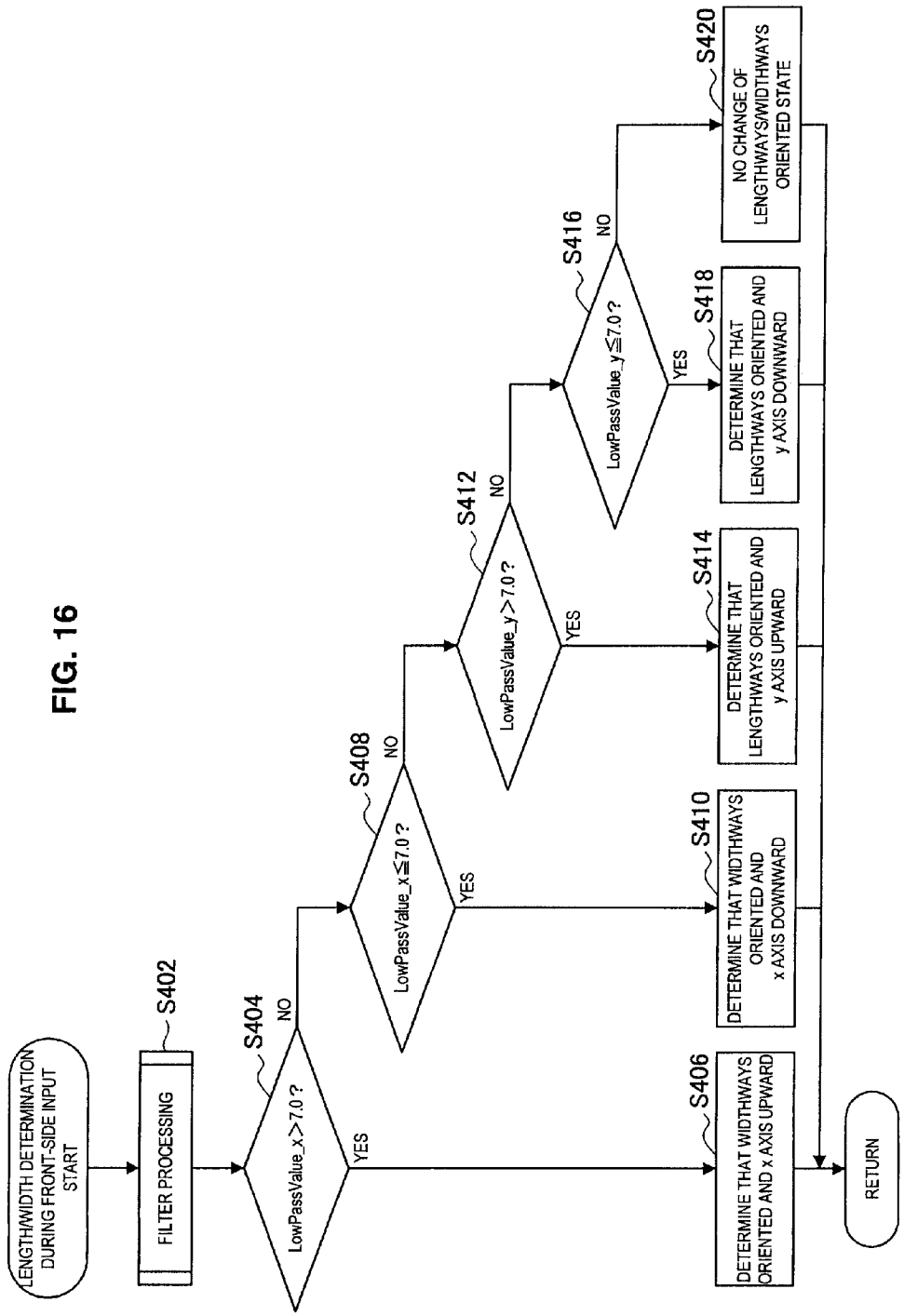
FIG. 16 is a flow chart showing length/width determination processing.

If the front-side input is determined in the present processing (step S116), the determination unit 253 also performs length/width determination processing shown in FIG. 16 to discriminate whether the remote control apparatus 200 is oriented widthways or lengthways (step S118).

FIG. 16 is a flow chart showing length/width determination processing. In the length/width determination processing, the determination unit 253 first performs filter processing (step S402). More specifically, the determination unit 253 performs low-pass filter processing shown in FIG. 17.

Figure 17:
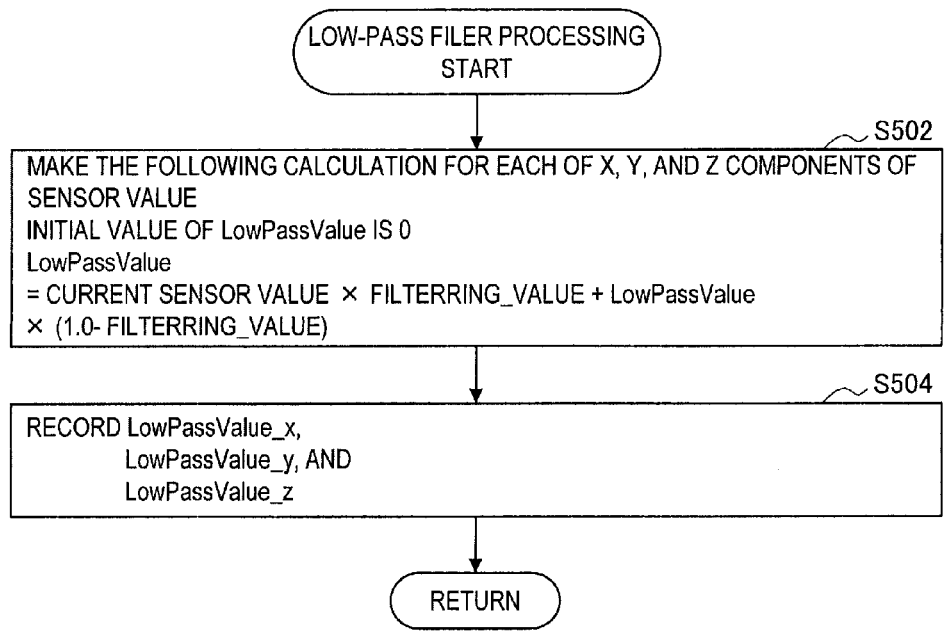
FIG. 17 is a flow chart showing low-pass filter processing.

FIG. 17 is a flow chart showing low-pass filter processing. First, the controller unit 250 makes the following calculation for each of x, y, and z components of a sensor value of the acceleration sensor 242 (step S502).

LowpassValue=current sensor value×FILTER-
RING_VALUE+LowpassValue×(1.0−FILTER-
RING_VALUE)

The initial value of LowpassValue is 0.

Next, the controller unit 250 records LowpassValue_x, LowpassValue_y, and LowpassValue_z of the x, y, and z components of the sensor value calculated in step S502 (step S504). This completes the low-pass filter processing before returning to the flow chart in FIG. 16.

When the filter processing in step S402 is completed, the controller unit 250 determines the orientation of the remote control apparatus 200 based on the recorded LowpassValue_x and LowpassValue_y (steps S404 to S420).

More specifically, if LowpassValue_x is greater than 7.0, the controller unit 250 determines that the remote control apparatus 200 is oriented widthways and the positive orientation of the x axis of the remote control apparatus 200 is upward (steps S404, S406). If LowpassValue_x is smaller than 7.0, the controller unit 250 determines that the remote control apparatus 200 is oriented widthways and the positive orientation of the x axis of the remote control apparatus 200 is downward (steps S408, S410). Similarly, if LowpassValue_y is greater than 7.0, the controller unit 250 determines that the remote control apparatus 200 is oriented lengthways and the positive orientation of the y axis of the remote control apparatus 200 is upward (steps S412, S414). If LowpassValue_y is smaller than 7.0, the controller unit 250 determines that the remote control apparatus 200 is oriented lengthways and the positive orientation of the y axis of the remote control apparatus 200 is downward (steps S416, S418). This completes the length/width determination processing before returning to the flow chart in FIG. 13.

In the flow chart of FIG. 13, after the length/width determination processing in step S118 is completed, the controller unit 250 repeats the above sequence of processing to continuously determine the input state of the remote control apparatus 200.

According to the operation of the remote control apparatus described above, which surface of the front side 210 and the back side 220 of the remote control apparatus 200 is opposed to the user can be discriminated by determining the posture of the remote control apparatus 200 based on measurement results of the acceleration sensor 242. Particularly when the user changes the way of holding the remote control apparatus 200, which surface of the front side 210 and the back side 220 is opposed to the user can appropriately be discriminated.

(1-5. Operation of TV Apparatus)

Figure 18:
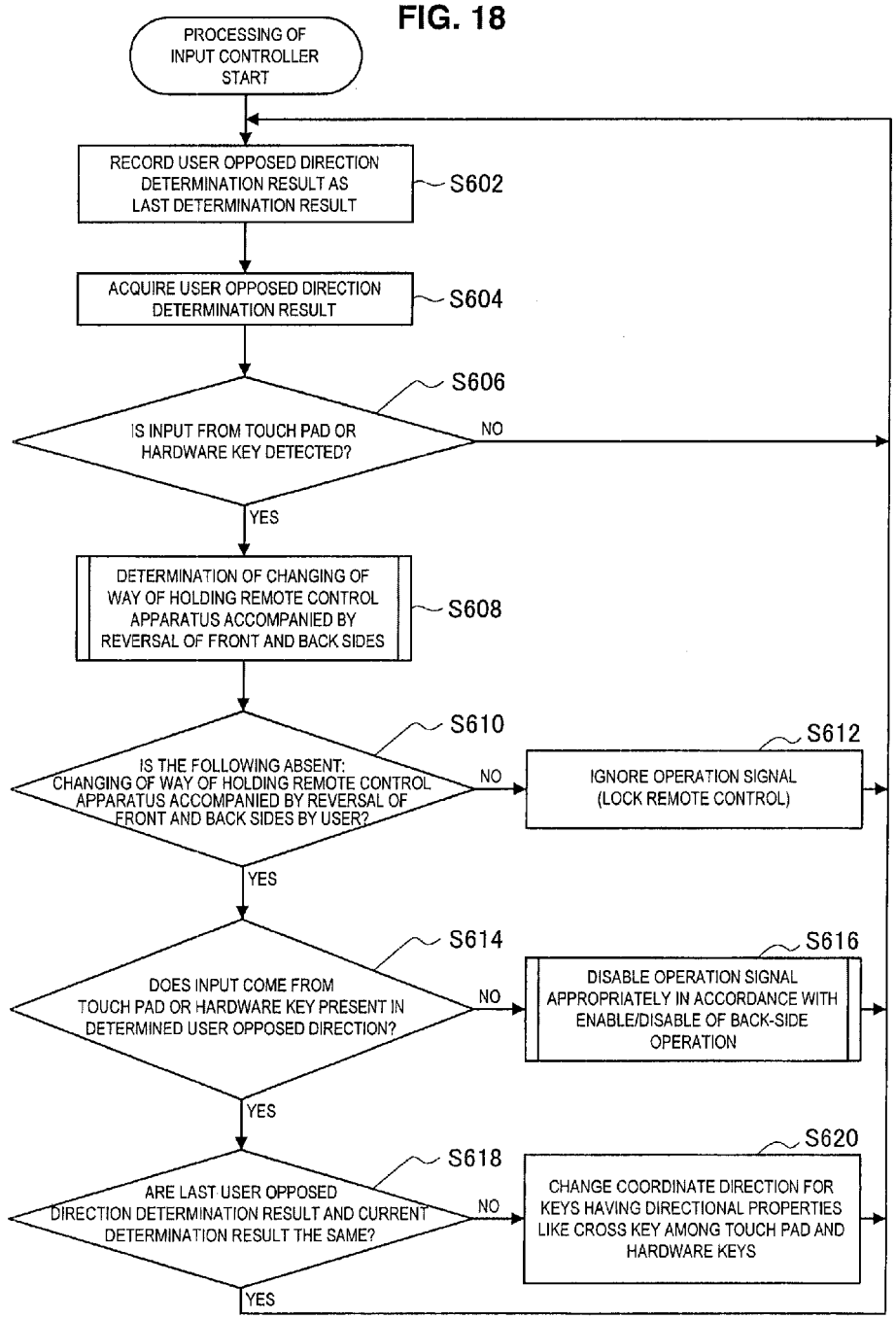
FIG. 18 is a flow chart showing an operation example of the TV apparatus.

An operation example of the TV apparatus 100 when processing corresponding to input by the remote control apparatus 200 is performed will be described with reference to FIG. 18. FIG. 18 is a flow chart showing an operation example of the TV apparatus 100. The flow chart in FIG. 18 starts when the user holds the remote control apparatus 200 whose front side 210 is opposed to the user in his hand.

The present processing is realized by a program stored in the ROM being executed by the CPU of the controller unit 140 of the TV apparatus 100.

First, the controller unit 140 records opposing information (user opposed direction determination result by the determination unit 253) from the remote control apparatus 200 (step S602). Next, the controller unit 140 (opposing information receiving unit 143) acquires a user opposed direction determination result (opposing information) by the determination unit 253 from the remote control apparatus 200 (step S604).

Next, the controller unit 140 determines whether input from the first operation receiving unit or the second operation receiving unit of the remote control apparatus 200 is detected (step S606). If input is detected in step S606 (Yes), the controller unit 140 performs determination processing of changing of the way of holding the remote control apparatus 200 accompanied by the reversal of the front and back sides shown in FIG. 19 (step S608).

Figure 19:
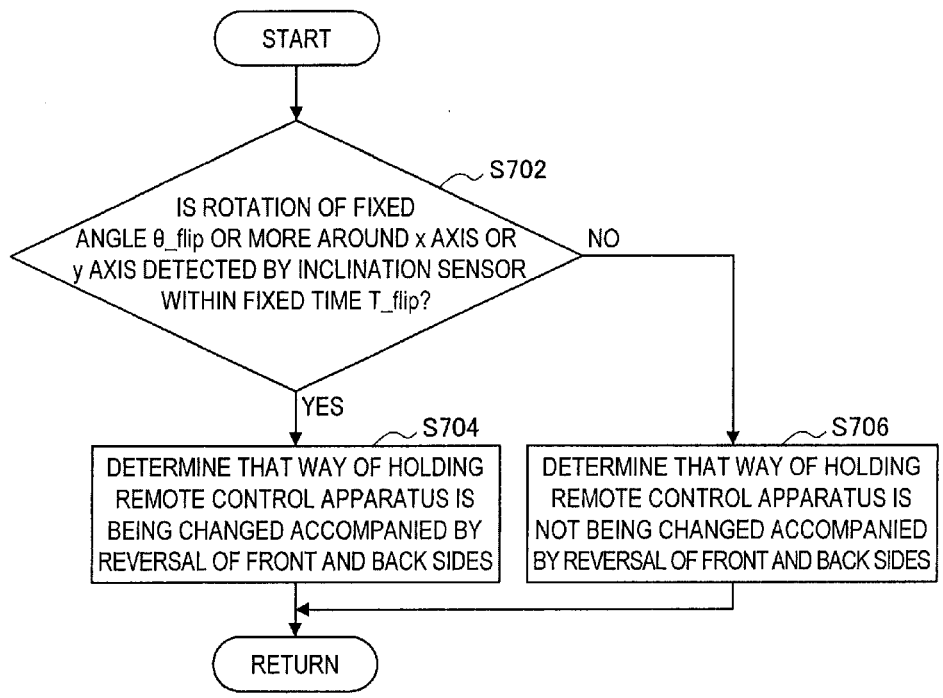
FIG. 19 is a flow chart showing determination processing of changing of the way of holding the remote control apparatus accompanied by the reversal of the front and back sides.

FIG. 19 is a flow chart showing determination processing of changing of the way of holding of the remote control apparatus 200 accompanied by the reversal of the front and back sides. First, the controller unit 140 determines whether the rotation of a predetermined angle or more is detected by the inclination sensor 244 within a predetermined time around the x axis or the y axis of the remote control apparatus 200 (step S702).

If the rotation of a predetermined angle or more is detected in step S702 (Yes), the controller unit 140 determines that the way of holding the remote control apparatus 200 is being changed accompanied by the reversal of the front/back sides (step S704). On the other hand, if the rotation of a predetermined angle or more is not detected in step S702 (No), the controller unit 140 determines that the way of holding the remote control apparatus 200 is not being changed accompanied by the reversal of the front/back sides (step S706). This completes the determination processing of changing of the way of holding the remote control apparatus 200 accompanied by the reversal of the front and back sides before returning to the flow chart in FIG. 18.

Based on the result of the determination processing in step S608, the controller unit 140 determines whether the user is changing the way of holding the remote control apparatus 200 accompanied by the reversal of the front and back sides thereof (step S610). If it is determined in step S610 that the user is changing the way of holding the remote control apparatus 200 (No), the controller unit 140 ignores remote operation information (operation signal) received by the input receiving unit 142 from the remote control apparatus 200 while the way of holding the remote control apparatus being changed (step S612). Accordingly, an erroneous input while the way of holding the remote control apparatus is being changed can be prevented.

If it is determined in step S610 that the user is not changing the way of holding the remote control apparatus 200 (Yes), the controller unit 140 determines whether the input comes from the first operation receiving unit on the front surface (here, the front side 210) of the remote control apparatus 200 opposed to the user (step S614). That is, the controller unit 140 determines whether the user has done input from one of the cross key unit 212, the button unit 214, and the touch pad unit 216 provided on the front side 210.

Figure 20:
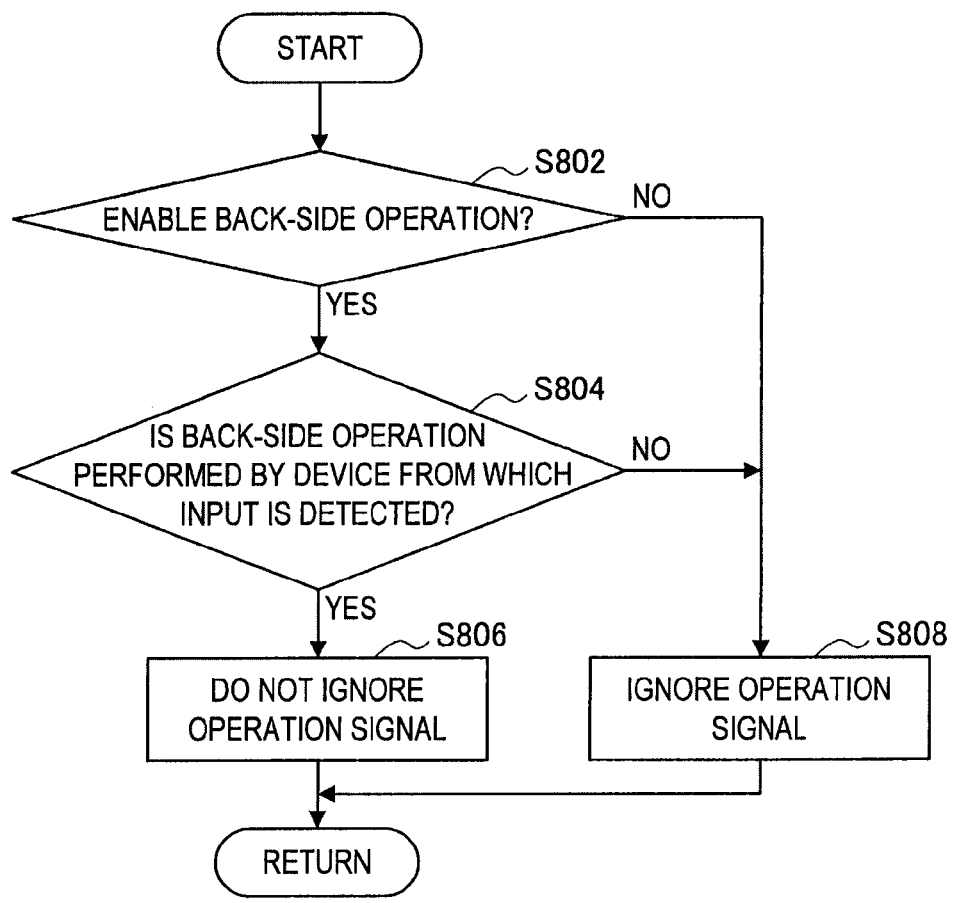
FIG. 20 is a flow chart showing disable processing of an operation signal in accordance with enable/disable of a back-side operation of the remote control apparatus.

It is determined in step S614 that the input does not come from the first operation receiving unit (No), the controller unit 140 performs appropriate disable processing of an operation signal in accordance with enable/disable of the back-side operation of the remote control apparatus 200 shown in FIG. 20 (step S616).

FIG. 20 is a flow chart showing disable processing of an operation signal in accordance with enable/disable of the back-side operation of the remote control apparatus 200. In the present processing, the controller unit 140 determines whether to enable the back-side operation, for example, in accordance with the application being executed (step S802).

If the back-side operation is to be enabled in step S802 (Yes), the controller unit 140 determines whether a back-side operation is performed by the operation receiving unit from which input is detected (step S804). If a back-side operation is performed by the operation receiving unit from which input is detected in step S804 (Yes), the controller unit 140 performs processing in accordance with an operation signal without ignoring the operation signal (step S806). Accordingly, processing by the back-side operation intended by the user is appropriately performed.

On the other hand, if no back-side operation is performed by the operation receiving unit from which input is detected in step S804 (No), the controller unit 140 ignores an operation signal (step S808). Also, when the back-side operation is to be disabled in step S802 (No), the controller unit 140 ignores an operation signal (step S808). Accordingly, an erroneous operation of an application based on an unintended input of the user from the operation receiving unit on the back side 20 of the remote control apparatus 200 can be prevented.

When the disable processing of an operation signal in accordance with enable/disable of the back-side operation of the remote control apparatus 200 is completed, the processing returns to the flow chart in FIG. 18.

If it is determined in step S614 that the input comes from the first operation receiving unit (Yes), the controller unit 140 determines whether the last user opposed direction determination result and the determination result of this time are the same (step S618).

If the determination results are not the same in step S618 (No), the controller unit 140 changes the coordinate direction for input from the touch pad unit 216 or the cross key unit 212 (step S620). Then, the controller unit 140 performs processing based on input after the coordinate change. Accordingly, for example, the user can perform a free cursor operation by the back-side operation or a gesture input on a touch pad.

If the determination results are the same in step S618 (Yes), the controller unit 140 performs processing in accordance with input from the remote control apparatus 200 without performing coordinate change. Then, the controller unit 140 repeats the above processing.

According to the first embodiment described above, even if input is done by the first operation receiving unit and the second operation receiving unit provided on different surfaces, processing conforming to the opposing state of the remote control apparatus 200 to the user can be performed. Thus, erroneous input by the user into the first operation receiving unit and the second operation receiving unit having mutually different operation receiving modes can be prevented and even if an erroneous input is done, the erroneous input can be changed into an appropriate input for processing. For example, even if input (back-side input) by the operation receiving unit provided on the opposite surface of the surface opposed to the user is done, unintended processing of the user by back-side input that is likely to occur erroneously can be prevented from being performed by disabling back-side input.

When it is determined that the user changes the way of holding the remote control apparatus 200, an erroneous input while the way of holding the remote control apparatus is being changed can be prevented by disabling input from the input unit while the way of holding the remote control apparatus is being changed. Therefore, according to the first embodiment, usability when input is done into the remote control apparatus 200 provided with a plurality of operation receiving units can be improved.

In the foregoing, an example in which the front/back discrimination of the remote control apparatus 200 is made based on measurement results by the acceleration sensor 242 is described, but the present embodiment is not limited to such an example. For example, the front/back discrimination of the remote control apparatus 200 may be made based on imaging results by the imaging unit 230. More specifically, a camera is provided on each of the front side 210 and the back side 220 of the housing 201 and the surface on which the camera capturing a user's image is arranged is determined to be opposed to the user. In addition, the front/back discrimination of the remote control apparatus 200 may be made by using both of measurements results by the acceleration sensor 242 and imaging results by the imaging unit 230. In such a case, the surface of the remote control apparatus 200 opposed to the user can be discriminated more precisely.

<2. Second Embodiment>

Figure 21:
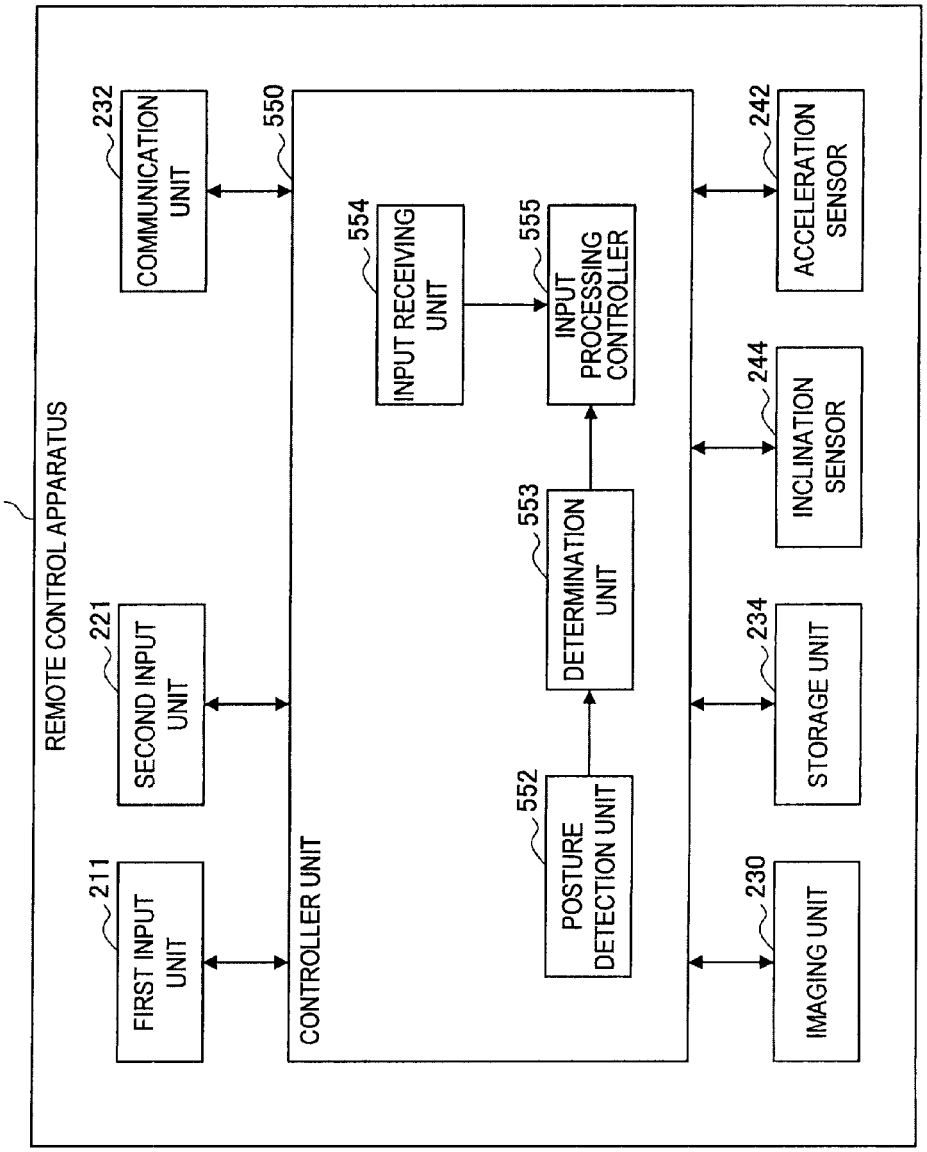
FIG. 21 is a block diagram showing the detailed configuration of the remote control apparatus according to a second embodiment.

A detailed configuration of a remote control apparatus 500 according to the second embodiment will be described with reference to FIG. 21. FIG. 21 is a block diagram showing the detailed configuration of the remote control apparatus 500 according to the second embodiment.

In the first embodiment, remote operation information input from the remote control apparatus 200 and opposing information are transmitted to the TV apparatus 100 and the controller unit 140 of the TV apparatus 100 determines whether to enable or disable the received remote operation based on the received opposing information. In the second embodiment, by contrast, a controller unit of the remote control apparatus 500 exercises control so as to transmit a signal corresponding to a valid remote operation to the TV apparatus 100. Thus, in the second embodiment, the TV apparatus 100 performs all processing corresponding to the received operation signal.

The remote control apparatus 500 according to the second embodiment is configured in the same manner as the remote control apparatus 200 shown in FIG. 4 except the controller unit 250. A controller unit 550 of the remote control apparatus 500 will mainly be described below and the description of others is omitted. In the first embodiment, the controller unit 140 of the TV apparatus 100 corresponds to the control apparatus and in the second embodiment, the controller unit 550 of the remote control apparatus 500 corresponds to the control apparatus.

As shown in FIG. 21, the controller unit 550 includes a posture detection unit 552, a determination unit 553, an input receiving unit 554, and an input processing controller 555.

The posture detection unit 552 detects the posture of the remote control apparatus 500 based on measurement results of the acceleration sensor 242 and the inclination sensor 244. The posture detection unit 552 continuously detects the posture of the remote control apparatus 500 based on measurement results output in a predetermined sampling period when the user operates the remote control apparatus 500.

The determination unit 553 determines which surface of the front side 210 and the back side 220 of the housing 201 is opposed to the user of the remote control apparatus 200 based on detection results by the posture detection unit 252 or detection results by the imaging unit 230 (front/back determination). The determination unit 253 can also determine the orientation (widthways or lengthways) of the front side 210 of the remote control apparatus 200 based on detection results by the posture detection unit 252 or detection results by the imaging unit 230 (length/width determination).

The input receiving unit 554 receives a first input signal generated by the first input unit 211 and a second input signal generated by the second input unit 221. The input receiving unit 554 ends the received first input signal and second input signal to the input processing controller 555.

The input processing controller 555 changes one of processing corresponding to the first input signal and processing corresponding to the second input signal received by the input receiving unit 554 based on a determination result by the determination unit 553. For example, if the determination unit 553 determines that the front side 210 is opposed to the user, the input processing controller 555 sets input corresponding to an input signal generated by the first input unit 211 as valid input and input corresponding to an input signal generated by the second input unit 221 as invalid input. Then, the input processing controller 555 exercises control so that only signals corresponding to valid input are transmitted to the TV apparatus 100.

According to the second embodiment, like in the first embodiment, even if input is done by a first operation receiving unit and a second operation receiving unit provided on different surfaces, processing conforming to the opposing state of the remote control apparatus 200 to the user can be performed. Thus, for example, erroneous input by the user into the first operation receiving unit and the second operation receiving unit having mutually different operation receiving modes can be prevented and even if an erroneous input is done, the erroneous input can be changed into an appropriate input for processing. Therefore, usability during input into the remote control apparatus 200 provided with a plurality of operation receiving units can be improved. Particularly in the second embodiment, the load of processing on the side of the TV apparatus 100 can be reduced. In addition, because only signals corresponding to valid input are transmitted to the TV apparatus 100, the number of times of communication by the communication unit of the remote control apparatus 200 is reduced and, as a result, power consumption of the remote control apparatus 200 can be reduced.

<3. Third Embodiment>

In the above embodiments, as shown in FIG. 5, it is assumed that when the front side 210 of the remote control apparatus 200 is opposed to the user, an operation can be performed in one of states (postures) of the lengthways orientation, first widthways orientation, and second widthways orientation of the remote control apparatus 200. In the third embodiment, by contrast, when the front side 210 is opposed to the user, the remote control apparatus 200 is operated in a lengthways oriented state.

FIG. 22 is a diagram showing a usage form of the remote control apparatus 200 according to the third embodiment. As shown in FIG. 22, the remote control apparatus 200 receives input of the user in a lengthways orientation state when the front side 210 is opposed to the user and receives input of the user in a widthways orientation state when the back side 220 is opposed to the user. Incidentally, one of the lengthways oriented state and the widthways oriented state of the remote control apparatus 200 corresponds to a first posture and the other corresponds to a second posture. The lengthways oriented state and the widthways oriented state are states mutually rotated around a virtual axis passing through the front side 210 and the back side 220 by approximately 90 degrees.

The configuration of the remote control apparatus 200 according to the third embodiment will be described here. A shown in FIG. 22, like the above embodiments, the cross key unit 212, the button unit 214, and the touch pad unit 216 are provided on the front side 210 of the remote control apparatus 200.

The cross key unit 212 includes an up key 212a, a right key 212b, a down key 212c, and a left key 212d as direction keys. The up key 212a and the down key 212c are provided along the longer direction of the remote control apparatus 200 and the right key 212b and the left key 212d are provided along the shorter direction. Character information 218 about the remote control apparatus 200 is inscribed on the front side 210 (for example, below the touch pad 216). The arrangement direction of characters of the character information 218 is a direction along the shorter direction of the remote control apparatus 200. Due to the arrangement direction of the above direction keys and the arrangement direction of the character information 218, when the front side 210 is opposed to the user, the user holds in a lengthways oriented state (lengthways holding) to use the remote control apparatus 200. The configuration of the button unit 214 and the touch pad unit 216 is the same as in the above embodiments and thus, a description thereof is omitted.

The keyboard unit 222 including a plurality of keys is provided on the back side 220 of the remote control apparatus 200. As shown in FIG. 22, the keyboard unit 222 includes an up key 222a, a right key 222b, a down key 222c, and a left key 222*d* as direction keys. The up key 222*a* and the down key 222*c* are provided along the shorter direction of the remote control apparatus 200 and the right key 222*b* and the left key 222*d* are provided along the longer direction. Character information 228 about the remote control apparatus 200 is inscribed on the back side 220. The arrangement direction of characters of the character information 228 is a direction along the longer direction of the remote control apparatus 200. Due to the arrangement direction of the above direction keys and the arrangement direction of the character information 218, when the back side 220 is opposed to the user, the user holds in a widthways oriented state (widthways holding) to use the remote control apparatus 200.

Then, in the third embodiment, the following processing is performed to reduce the processing load of front/back discrimination processing of the remote control apparatus 200. That is, whether the remote control apparatus 200 is in a lengthways held state or a widthways held state is detected and which of the front side 210 and the back side 220 is opposed to the user is determined based on the magnitude of acceleration in the z axis direction of the remote control apparatus 200 in the detected state.

Figure 23:
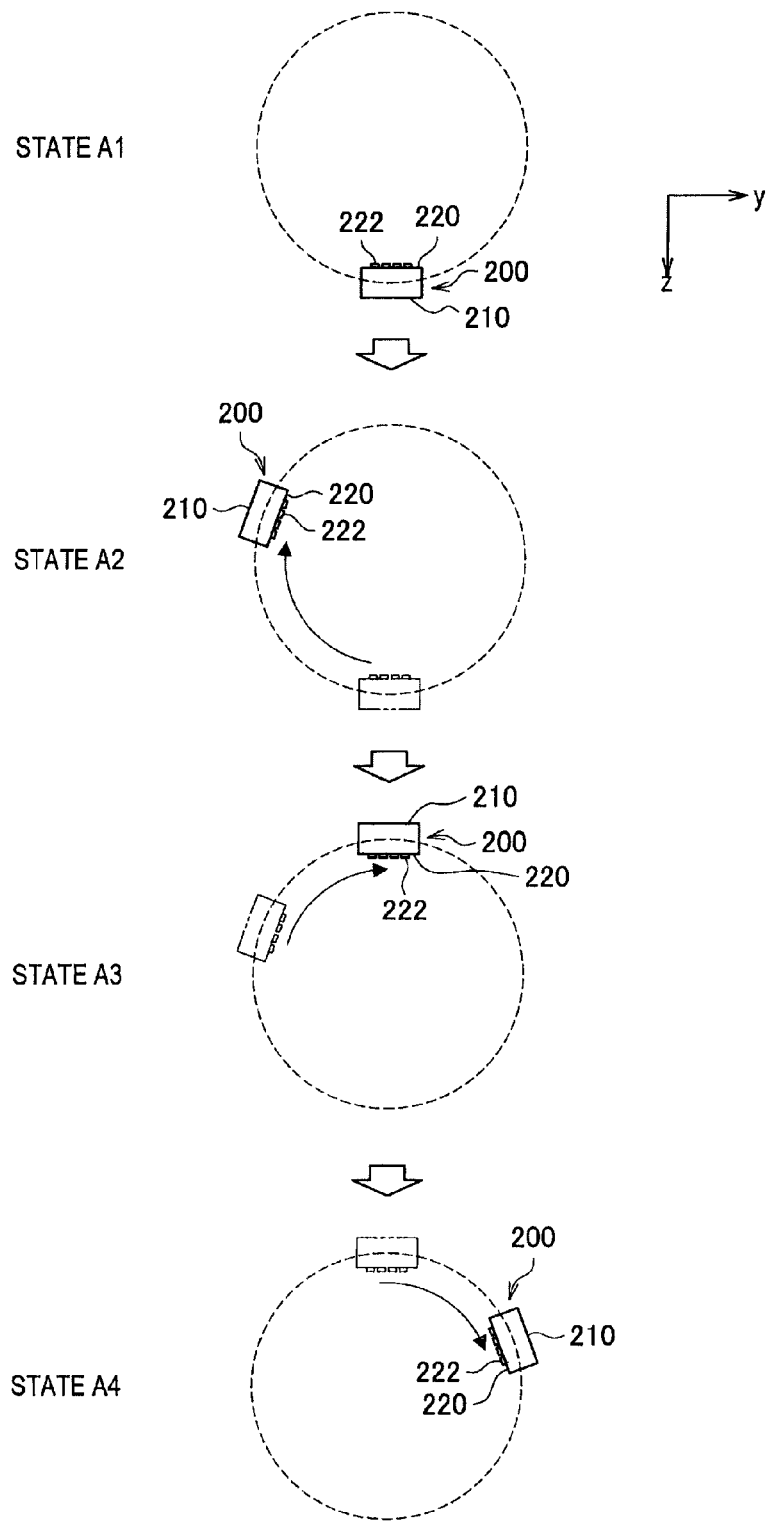
FIG. 23 is a schematic diagram illustrating front/back discrimination processing based on the acceleration in the z axis direction of the remote control apparatus in the lengthways held state.

A case when the lengthways held state is detected will be described with reference to FIG. 23. FIG. 23 is a schematic diagram illustrating front/back discrimination processing based on the acceleration in the z axis direction of the remote control apparatus 200 in the lengthways held state. In FIG. 23, the positive direction of the z axis of the remote control apparatus 200 is downward.

When the front/back side of the remote control apparatus 200 is turned over, the user rotates the remote control apparatus 200 by 180 degrees. In FIG. 23, the initial state of the remote control apparatus 200 is assumed to be state A1. Then, when the remote control apparatus 200 is rotated, the state of the remote control apparatus changes in the order of state A1, state A2, state A3, and state A4. In this case, the acceleration in the z axis direction of the remote control apparatus 200 is the greatest in state A1 and decreases from state A1 to state A3 as the remote control apparatus 200 rotates.

In the lengthways held state, the front side 210 is determined to be opposed to the user if the z axis acceleration is greater than a predetermined threshold (second threshold described later). More specifically, the remote control apparatus is determined to be in a front side opposed state in which the front side 210 is opposed to the user between state A1 and state A2 and between state A4 and state A1 shown in FIG. 23. On the other hand, the remote control apparatus is determined to be in a back side opposed state in which the back side 220 is opposed to the user between state A2 and state A4.

Figure 24:
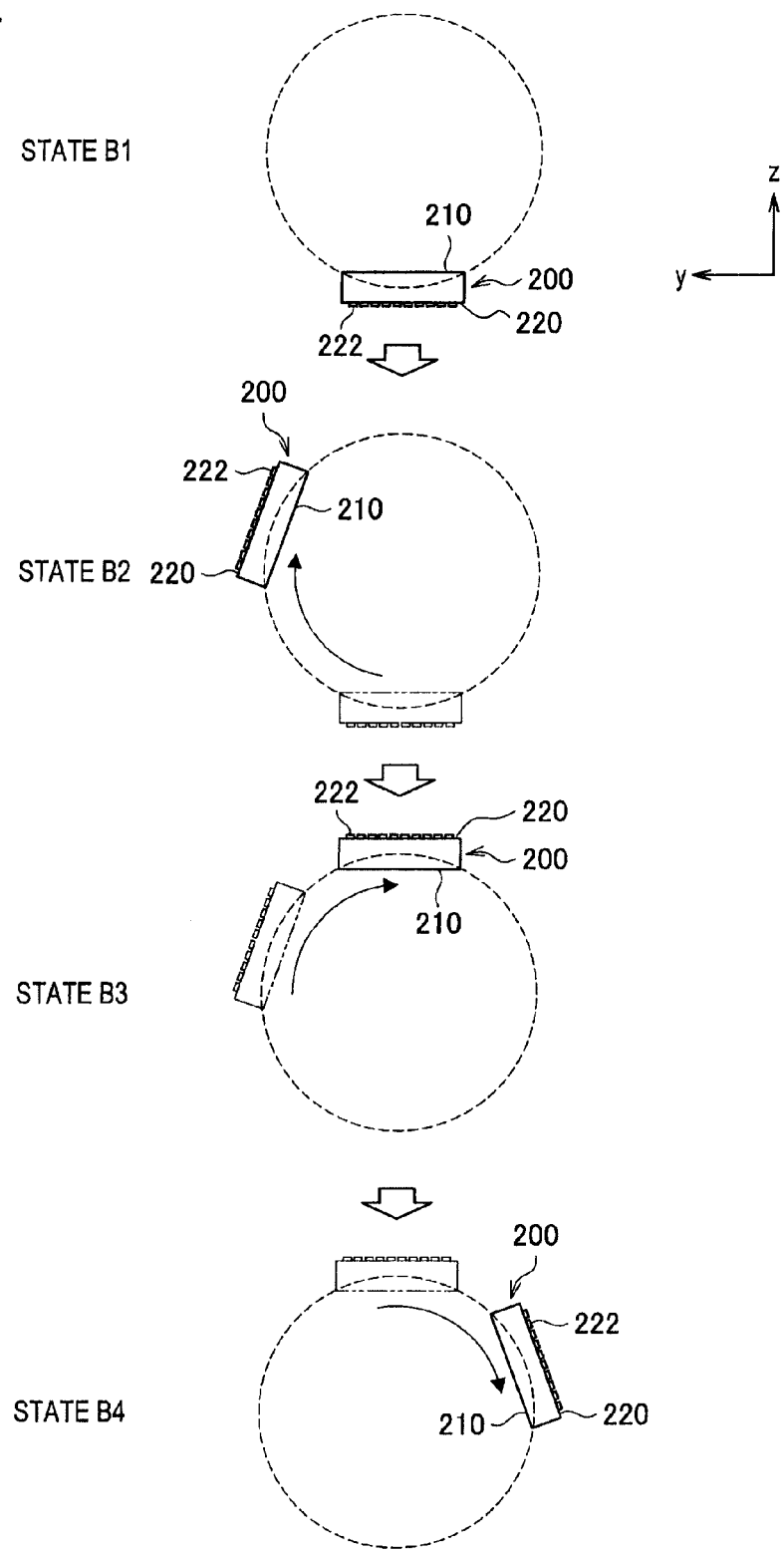
FIG. 24 is a schematic diagram illustrating front/back discrimination processing based on the acceleration in the z axis direction of the remote control apparatus in the widthways held state.

FIG. 24 is a schematic diagram illustrating front/back discrimination processing based on the acceleration in the z axis direction of the remote control apparatus 200 in the widthways held state. When a widthways held state is detected, determinations can be made similarly. In FIG. 24, the positive direction of the z axis of the remote control apparatus 200 is upward.

In the widthways held state, the back side 220 is determined to be opposed to the user if the z axis acceleration is smaller than a predetermined threshold (third threshold described later). More specifically, the remote control apparatus is determined to be in a back side opposed state between state B1 and state B2 and between state 134 and state B1 shown in FIG. 24 and is determined to be in a front side opposed state between state B2 and state B4.

According to the front/back determination processing described above, not only the front/back discrimination of the remote control apparatus 200 can be made with high precision, but also the front/back discrimination of the remote control apparatus 200 can be made swiftly because the number of pieces of processing is small.

Figure 25:
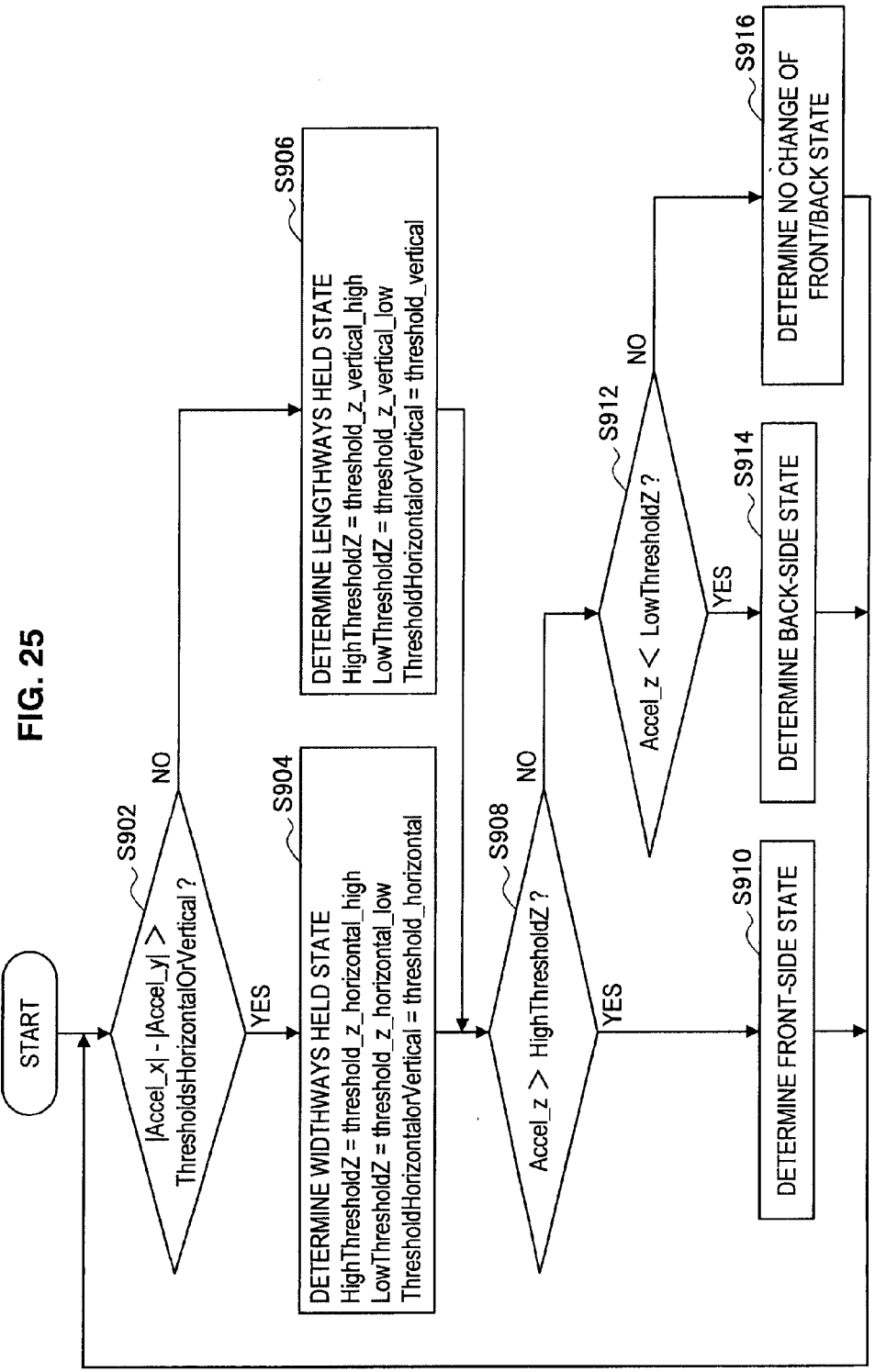
FIG. 25 is a flow chart showing an operation example of the remote control apparatus according to the third embodiment.

Next, an operation example of the remote control apparatus 200 when the front/back determination processing according to the third embodiment is performed will be described with reference to FIG. 25. FIG. 25 is a flow chart showing an operation example of the remote control apparatus 200 according to the third embodiment.

The present processing is realized by a program stored in the ROM being executed by the CPU of the controller unit 250 (see FIG. 4) of the remote control apparatus 200. The flow chart in FIG. 25 starts when the acceleration sensor 242 (FIG. 4) measures acceleration values in the x axis, y axis, and z axis of the remote control apparatus 200 held by the user.

First, the determination unit 253 of the controller unit 250 determines which of the absolute value of measured acceleration (Accel_x) in the x axis and the absolute value of measured acceleration (Accel_y) in the y axis is larger. More specifically, the determination unit 253 determines whether a subtracted value obtained by subtracting the absolute value of acceleration in the y axis direction from the absolute value of acceleration in the x axis direction is larger than a first threshold (Thresholds Horizontal Or Vertical) (step S902). The first threshold is a value set during the last front/back determination processing.

If the subtracted value is larger than the first threshold in step S902 (Yes), the determination unit 253 determines that the remote control apparatus 200 is in a widthways held state (step S904). Then, the determination unit 253 sets the first threshold (Thresholds Horizontal Or Vertical), the second threshold (HighThresholdZ), and the third threshold (LowThresholdZ). More specifically, the determination unit 253 sets threshold_horizontal as the first threshold, threshold_z_horizontal_high as the second threshold, and threshold_z_horizontal_low as the third threshold. The values of threshold_horizontal, threshold_z_horizontal_high, and threshold_z_horizontal_low are preset. Incidentally, the second threshold is larger than the third threshold.

On the other hand, if the subtracted value is smaller than the first threshold in step S902 (No), the determination unit 253 determines that the remote control apparatus 200 is in a lengthways held state (step S906). Then, the determination unit 253 (the determination unit 253) sets the first threshold (Thresholds Horizontal Or Vertical), the second threshold (HighThresholdZ), and the third threshold (LowThresholdZ). More specifically, the determination unit 253 sets threshold_vertical as the first threshold, threshold_z_vertical_high as the second threshold, and threshold_z_vertical_low as the third threshold. The values of threshold_vertical, threshold_z_vertical_high, and threshold_z_vertical_low are preset.

Next, the determination unit 253 determines whether the acceleration (Accel_z) in the z axis direction is larger than the second threshold (HighThresholdZ) set in step S904 (step S908). If the acceleration (Accel_z) in the z axis direction is larger than the second threshold in step S908 (Yes), the determination unit 253 determines that the remote control apparatus is in a front surface input state (state in which the front side 210 of the remote control apparatus 200 is opposed to the user) (step S910).

If the acceleration (Accel_z) in the z axis direction is smaller than the second threshold in step S908 (No), the determination unit 253 determines whether the acceleration (Accel_z) in the z axis direction is smaller than the third threshold (LowThresholdZ) (step S912). If the acceleration (Accel_z) in the z axis direction is smaller than the third threshold in step S912 (Yes), the determination unit 253 determines that the remote control apparatus is in a back surface input state (state in which the back side 220 of the remote control apparatus 200 is opposed to the user) (step S914).

If the acceleration (Accel_z) in the z axis direction is larger than the third threshold set in step S906 in step S912 (No), the determination unit 253 determines that the front/back state of the remote control apparatus 200 does not change (step S916).

Then, the determination unit 253 repeats the above processing (steps S902 to S916) to continue the front/back discrimination processing of the remote control apparatus 200. While each step is executed by the determination unit 253 above, for example, a portion of steps may be executed by the posture detection unit 252.

According to the third embodiment, as described, not only the front/back discrimination of the remote control apparatus 200 can be made with high precision, but also the front/back discrimination of the remote control apparatus 200 can be made in a smaller number of processing steps.

It is assumed above that the second threshold and the third threshold are preset, but the present embodiment is not limited to such an example. For example, if the input unit receiving an operation in the detected posture receives operations a predetermined number of times or more in a predetermined time, the determination unit 253 may determine which of the front side 210 and the back side 220 is opposed to the user by changing the size of the second threshold or the third threshold.

Figure 26:
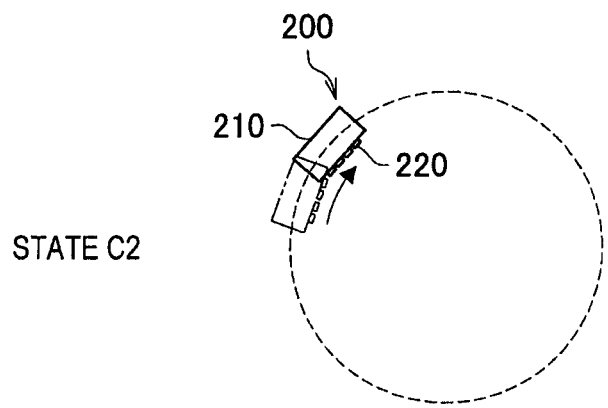
FIG. 26 is a schematic diagram illustrating a modification.

If, for example, the first input unit 211 receives operations a predetermined number of times or more in a predetermined time between state A1 and state A2 in FIG. 23, the size of the second threshold is changed (the second threshold is made smaller). Accordingly, as shown in FIG. 26, the region in which the remote control apparatus 200 is in a front side opposed state is widened (state C2 in FIG. 26 corresponds to state A2 in FIG. 23). If the user frequently performs operations on the first input unit 211, the user can be assumed to continue to perform operations on the first input unit 211 and thus, even if the remote control apparatus 200 is forced to be in the front side opposed state even if the remote control apparatus is rotated. Accordingly, an input system of operation according to the user's intention can be realized. Incidentally, FIG. 26 is a schematic diagram illustrating a modification.

<4. Fourth Embodiment>

In a remote control apparatus according to the fourth embodiment, the button unit 214 (or the cross key unit 212) of the first input unit 211 provided on the front side 210 and the keyboard unit 222 of the second input unit 221 provided on the back side 220 are configured to light. That is, the button unit 214 and the keyboard unit 222 have a function as a notification unit that makes a notification to the user.

The reason why the button unit 214 and the keyboard unit 222 light is to cause the user to be aware of which of the first input unit 211 and the second input unit 221 is a valid remote operation. Thus, the button unit 214 lights when front-side input (the front side 210 is opposed to the user) is done by the user and the keyboard unit 222 lights when back-side input (the back side 220 is opposed to the user) is done by the user.

Lighting of the button unit 214 and the keyboard unit 222 is controlled by the controller unit 550 (FIG. 21) of the remote control apparatus. That is, an input processing controller 555 of the controller unit 550 control lighting of the button unit 214 and the keyboard unit 222 based on a determination result (determination result of which of the front side 210 and the back side 220 is opposed to the user) of the determination unit 553. When the front side 210 is opposed to the user, the input processing controller 555 makes a notification by lighting the button unit 214 provided on the front side 21 and when the back side 220 is opposed to the user, the input processing controller 555 makes a notification by lighting the keyboard unit 222 provided on the back side 220.

After the user changes the way of holding the remote control apparatus, the input processing controller 555 may continue lighting of the button unit 214 or the keyboard unit 222. Then, if there is no input from the input unit when a predetermined time passes after starting lighting, the input processing controller 555 may end lighting. Accordingly, the user can reliably be aware of lighting and also increased power consumption due to a longer lighting time can be inhibited.

According to the fourth embodiment, the user can easily be aware of which of the first input unit 211 and the second input unit 221 is valid input by controlling lighting of the button unit 214 and the keyboard unit 222 based on a determination result by the determination unit 553.

The button unit 214 and the keyboard unit 222 are caused to light as notification units, but the present embodiment is not limited to such an example. For example, a special LED may be provided on each of the front side 210 and the back side 220 to make a notification by lighting the LED. Alternatively, a speaker may be provided in the remote control apparatus 200 to make a notification to the user by sound output from the speaker. Alternatively, information indicating which input unit of the first input unit 211 and the second input unit 221 is capable of performing a remote operation may be displayed on the display screen of the TV apparatus 100. In such cases, a similar effect can also be obtained.

<5. Fifth Embodiment>

Figure 27:
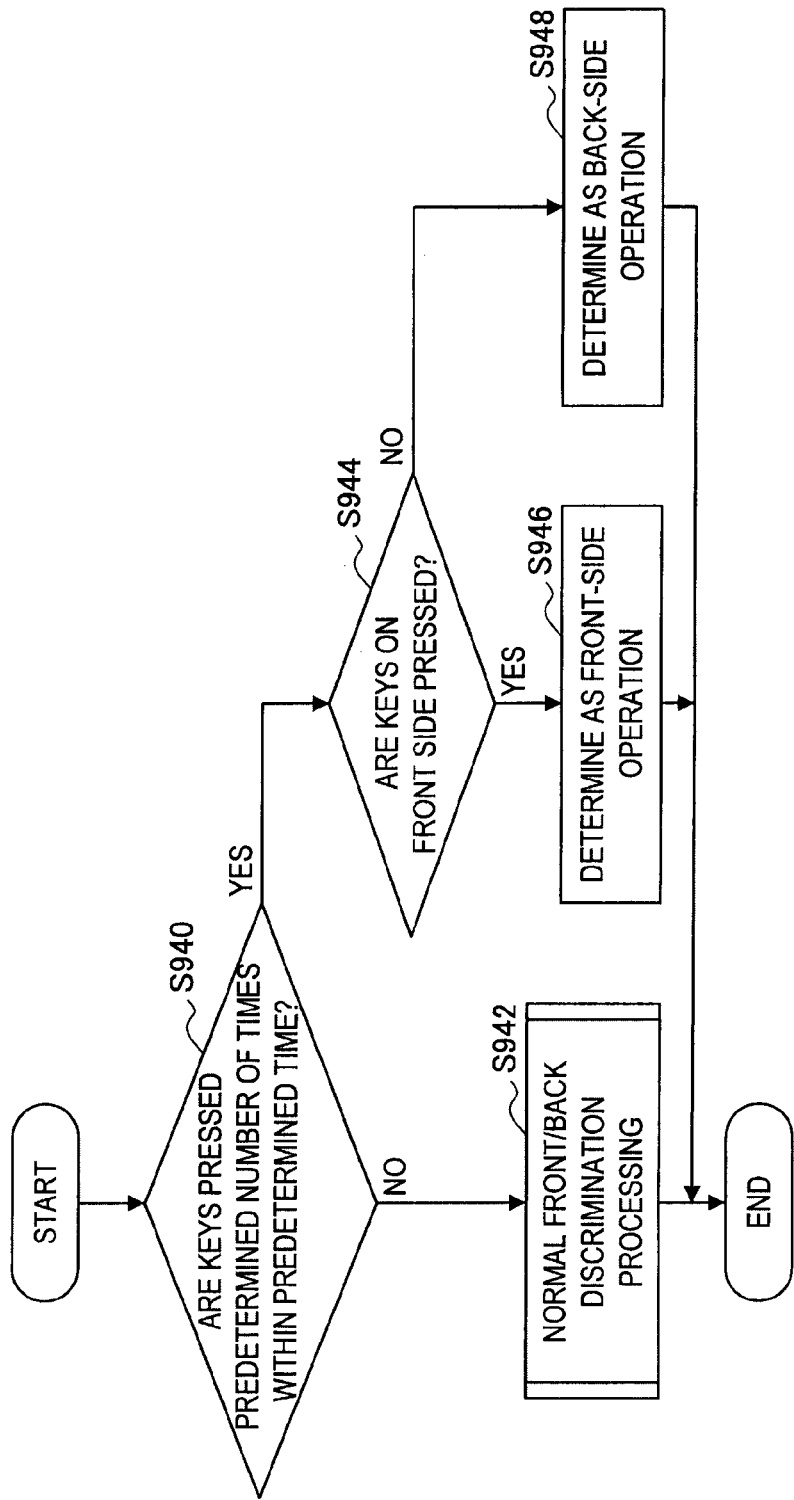
FIG. 27 is a flow chart showing an operation example of the remote control apparatus according to a fifth embodiment.

Next, an operation example of the remote control apparatus 200 when the front/back determination processing according to the fifth embodiment is performed will be described with reference to FIG. 27. FIG. 27 is a flow chart showing an operation example of the remote control apparatus 200 according to the fifth embodiment.

First, the determination unit 553 determines whether keys are pressed a predetermined number of times or more in a predetermined time (step S940). If keys are not pressed a predetermined number of times in step S940 (No), the determination unit 553 performs, for example, the above front/back discrimination processing (normal front/back discrimination processing) in FIG. 25 (step S942).

If keys are pressed a predetermined number of times in step S940 (Yes), the determination unit 553 determines whether keys pressed are keys on the front side 210 (step S944). If keys pressed are keys on the front side 210 (the cross key unit 212 or the button unit 214) in step S944 (Yes), the determination unit 553 determines that a front-side operation is being performed without performing normal front/back discrimination processing (step S946). Then, processing corresponding to an operation received by the first input unit 211 provided on the front side 210 is performed.

On the other hand, if keys pressed are keys on the back side 220 (the keyboard unit 222) in step S944 (No), the determination unit 553 determines that a back-side operation is being performed without performing normal front/back discrimination processing (step S948). Then, processing corresponding to an operation received by the second input unit 221 provided on the back side 220 is performed.

Thus, if one input unit of the first input unit 211 and the second input unit 221 receives operations of a predetermined number of times or more in a predetermined time, the input processing controller 555 forcibly performs processing in accordance with an operation on one input unit. That is, regardless of which of the front side 210 and the back side 220 is opposed to the user, processing corresponding to an operation received by the input unit receiving more inputs from the user is forcibly performed. Accordingly, an input system of operation according to the user's intention can be realized regardless of the method of holding the remote control apparatus 200.

Whether keys are pressed a predetermined number of times or more in a predetermined time is determined above, but the present embodiment is not limited to such an example. For example, the speed of changing of the way of holding the remote control apparatus 200 by the user may be detected and if the detected changing speed is faster than a predetermined time, input into the input unit after the way of holding is changed may be enabled regardless of which of the front side 210 and the back side 220 is opposed to the user.

A lock button that enables input of one of the first input unit 211 and the second input unit 221 may be provided in the remote control apparatus 200. Then, when the lock button is turned on, input of only one of the first input unit 211 and the second input unit 221 is enabled regardless of which of the front side 210 and the back side 220 is opposed to the user. Accordingly, an input system of operation according to the user's intention can be realized regardless of the method of holding the remote control apparatus 200.

Incidentally, the TV apparatus 100 makes the recommendation display of the method of holding the remote control apparatus 200. In the first embodiment, as shown in FIGS. 7 to 12, states of the remote control apparatus 200 after the way of holding is changed are displayed, but the present embodiment is not limited to such an example and, for example, a display mode shown in FIG. 28 may also be used.

Figure 28:
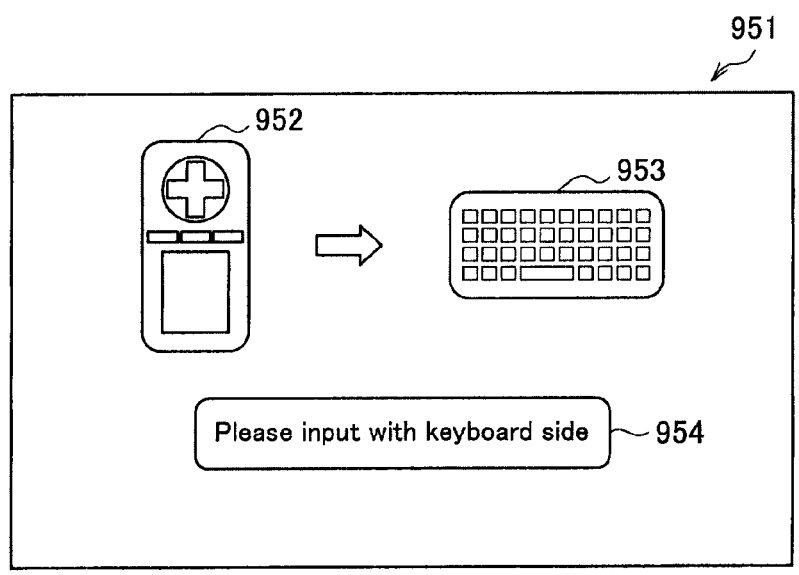
FIG. 28 is a diagram showing a modification of the recommendation display of the method of holding the remote control apparatus.

FIG. 28 is a diagram showing a modification of the recommendation display of the method of holding the remote control apparatus 200. On a screen 951 displayed by the TV apparatus 100, an icon 952 showing the state of the remote control apparatus 200 before changing the way of holding (that is, the current state) and an icon 953 showing the state of the remote control apparatus 200 after changing the way of holding are shown. The icon 952 shows a lengthways held state of the remote control apparatus 200 and the icon 953 shows a widthways held state of the remote control apparatus 200. In addition, character information 954 about changing the way of holding the remote control apparatus is together displayed on the screen 951.

Thus, content prompting the user to change the method of holding the remote control apparatus 200 from the lengthways held state to the widthways held state is displayed on the screen 951 and the user viewing the screen 951 can more easily change the method of holding the remote control apparatus appropriately.

Figure 29:
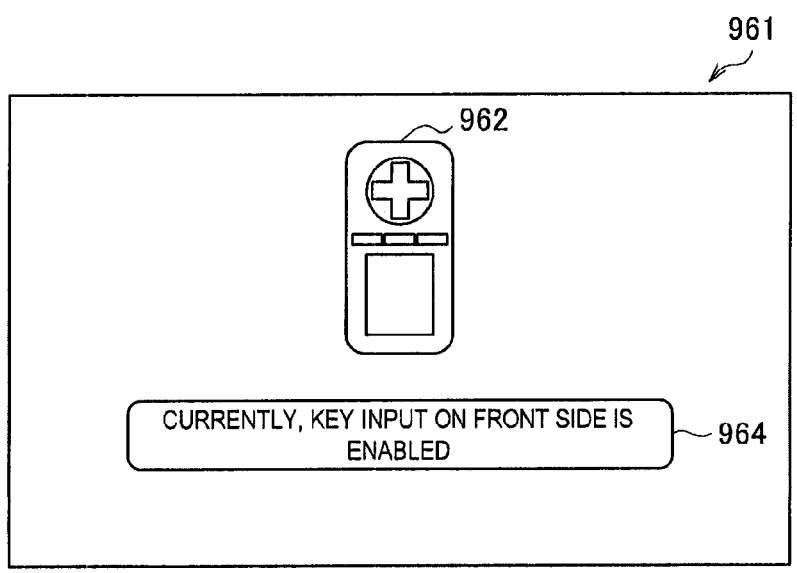
FIG. 29 is a diagram illustrating a modification of the display by the TV apparatus.

The TV apparatus 100 displays the icon 953 showing the state of the remote control apparatus 200 after changing the way of holding in the above case, but the present embodiment is not limited to such an example. For example, as shown in FIG. 29, the TV apparatus 100 may display a screen 961 containing an icon 962 indicating the current state of the remote control apparatus 200, instead of the icon indicating the state after changing the way of holding the remote control apparatus, to notify the user. In this case, the TV apparatus 100 may display character information 964 (for example, information indicating input of which input unit of the first input unit 211 and the second input unit 221 is enabled) indicating the current state of the remote control apparatus 200 together on the screen 961 to notify the user. Accordingly, the user can be aware of the current state of the remote control apparatus 200 appropriately, which makes it easier for the user to input. Incidentally, FIG. 29 is a diagram illustrating a modification of the display by the TV apparatus 100.

<6. Other Embodiments>

The preferred embodiments of the present disclosure have been described above with reference to the accompanying drawings, whilst the present disclosure is not limited to the above examples, of course. A person skilled in the art may find various alternations and modifications within the scope of the appended claims, and it should be understood that they will naturally come under the technical scope of the present disclosure.

In the above embodiments, as shown in FIG. 3, the cross key unit 212, the button unit 214, and the touch pat unit 216 are provided on the front side 210 (front surface) of the remote control apparatus 200 and the keyboard unit 222 is provided on the back side 220 (back surface). For example, the configuration of the first operation receiving unit and the second operation receiving unit provided on the front side 210 and the back side 220 of the remote control apparatus 200 may be one of configurations like modifications shown in FIGS. 30 to 32.

FIG. 30 is a diagram showing a first modification of the first operation receiving unit and the second operation receiving unit of the remote control apparatus 200. FIG. 31 is a diagram showing a second modification of the first operation receiving unit and the second operation receiving unit of the remote control apparatus 200. FIG. 32 is a diagram showing a third modification of the first operation receiving unit and the second operation receiving unit of the remote control apparatus 200. In the first modification shown in FIG. 30, the button unit 214 and the touch pat unit 216 are provided on the front side 210 of the remote control apparatus 200, but the cross key unit 212 is not provided. In the second modification shown in FIG. 31, the cross key unit 212 and the button unit 214 are provided on the front side 210, but the touch pad unit 216 is not provided. In the third modification shown in FIG. 32, a touch pad unit 224 is provided, instead of the keyboard unit 222, on the back side 220 of the remote control apparatus 200. Incidentally, a touch panel may be provided on the front side 210 or the back side 220 as an operation receiving unit.

In addition, a display unit that displays information about an operation received by the operation receiving unit may be provided on the front side 210 or the back side 220 of the remote control apparatus 200. In such a case, the user can do input from the first operation receiving unit and the second operation receiving unit while viewing display content of the display unit of the remote control apparatus 200.

In the above embodiments, the first operation receiving unit is provided on the front side 210 of the housing 201 and the second operation receiving unit is provided on the back side 220 of the housing 201, but the present disclosure is not limited to such an example. For example, one of the first operation receiving unit and the second operation receiving unit may be provided on the side face of the housing 201.

In the above embodiments, the remote control apparatus 200 has, as shown in FIG. 2, a rectangular shape, but the present disclosure is not limited to such an example. For example, the remote control apparatus may have a triangular shape. In such a case, the first operation receiving unit and the second operation receiving unit are provided on the side face of the triangular shape.

In the above embodiments, the remote control apparatus 200 is taken as an example of the operation input apparatus, but the present disclosure is not limited to such an example. The operation input apparatus only needs to include an operation receiving unit on a different surface and may be, for example, a mobile phone, digital camera, PDA, game machine, electronic device, or tablet.

In the above embodiments, the TV apparatus 100 is taken as an example of the input signal receiving apparatus, but the present disclosure is not limited to such an example. The input signal receiving apparatus only needs to have a function to receive an operation signal from an operation input apparatus and may be, for example, an audio device or various electronic devices like a PC.

Steps shown in flow charts in the above embodiments include not only processing performed chronologically in the described order, but also processing performed in parallel or individually, though not necessarily performed chronologically. Even steps performed chronologically may naturally be changed in order when appropriate.

Additionally, the present technology may also be configured as below.

(1)

A control apparatus including:

an input signal receiving unit that receives a first input signal generated in accordance with an operation on a first operation receiving unit provided on a first surface of an operation input apparatus and a second input signal generated in accordance with an operation on a second operation receiving unit provided on a second surface, which is different from the first surface, of the operation input apparatus;

an opposing information acquisition unit that acquires opposing information indicating which surface of the first surface and the second surface is opposed to an operator of the operation input apparatus; and a processing controller that changes one of first processing corresponding to the first input signal and second processing corresponding to the second input signal based on the acquired opposing information.

(2)

The control apparatus according to (1), wherein if the first surface is opposed to the operator in the acquired opposing information, the processing controller disables a portion of the second processing.

(3)

The control apparatus according to (2), wherein the processing controller controls the first processing and the second processing on an application being executed of a plurality of applications and if the first surface is opposed to the operator in the acquired opposing information, sets the portion to be disabled in the second processing in accordance with the application being executed.

(4)

The control apparatus according to (3), wherein the second operation receiving unit includes a plurality of operation receiving members arranged in different positions on the second surface, and wherein, in accordance with the application being executed, the processing controller disables the second processing corresponding to the second input signal generated in accordance with the operation on the operation receiving member positioned in a predetermined position.

(5)

The control apparatus according to (1), wherein if the first surface is opposed to the operator in the acquired opposing information, the processing controller performs the first processing and also disables all the second processing.

(6)

The control apparatus according to any one of (1) to (5), wherein the processing controller disables all processing corresponding to the first input signal and the second input signal generated during switching when switching of a surface of the operation input apparatus opposed to the operator between the first surface and the second surface is detected based on the acquired opposing information.

(7)

The control apparatus according to any one of (1) to (6), wherein the processing controller further acquires orientation information about an orientation of a surface of the operation input apparatus and changes one of the first processing and the second processing based on the acquired opposing information and orientation information.

(8)

The control apparatus according to (7), wherein the first operation receiving unit and the second operation receiving unit receives the operation of coordinate axes indicating an operation direction, and wherein the processing controller changes the coordinate axes based on the acquired opposing information and orientation information and performs processing by changing the first input signal or the second input signal to a signal corresponding to the changed coordinate axes.

(9)

The control apparatus according to any one of (1) to (8), wherein the opposing information contains information determining which surface of the first surface and the second surface is opposed to the operator based on a detection result by an acceleration sensor that detects a posture of the operation input apparatus.

(10)

The control apparatus according to any one of (1) to (9), wherein the opposing information contains information determining which surface of the first surface and the second surface is opposed to the operator based on a result of imaging of the operator by an imaging member.

(11)

The control apparatus according to any one of (1) to (10), wherein the second surface is the surface positioned on an opposite side of the first side in the operation input apparatus.

(12)

The control apparatus according to (11), wherein the first operation receiving unit receives the operation in a state in which the operation input apparatus is positioned in a first posture, wherein the second operation receiving unit receives the operation in the state in which the operation input apparatus is positioned in a second posture reached by rotating from the first posture around an axis where the first surface and the second surface intersect by approximately 90 degrees, and wherein an acceleration sensor that detects acceleration in an axial direction of the operation input apparatus is provided in the operation input apparatus, the control apparatus further comprising:

a determination unit that detects whether the operation input apparatus is positioned in the first posture or the second posture and determines which surface of the first surface and the second surface is opposed to the operator based on a magnitude of the acceleration in the axial direction in a detected posture and a magnitude relation to a predetermined threshold.

(13)

The control apparatus according to (12), wherein the determination unit determines which surface of the first surface and the second surface is opposed to the operator by changing the magnitude of the predetermined threshold when one operation receiving unit of the first operation receiving unit and the second operation receiving unit, that receives the operation in the detected posture, receives the operation a predetermined number of times or more in a predetermined time.

(14)

The control apparatus according to any one of (1) to (11), wherein the processing controller causes a notification unit to make a notification of notification information representing the surface determined to be opposed to the operator based on the acquired opposing information.

(15)

The control apparatus according to any one of (1) to (11), wherein the processing controller forcibly performs processing corresponding to the operation of one operation receiving unit regardless of the opposing information when the one operation receiving unit of the first operation receiving unit and the second operation receiving unit receives the operation a predetermined number of times or more in a predetermined time.

(16)

A control method including:

receiving a first input signal generated in accordance with an operation on a first operation receiving unit provided on a first surface of an operation input apparatus and a second input signal generated in accordance with the operation on a second operation receiving unit provided on a second surface, which is different from the first surface, of the operation input apparatus;

acquiring opposing information indicating which surface of the first surface and the second surface is opposed to an operator of the operation input apparatus; and changing one of first processing corresponding to the first input signal and second processing corresponding to the second input signal based on the acquired opposing information.

(17)

A program causing a computer to execute:

receiving a first input signal generated in accordance with an operation on a first operation receiving unit provided on a first surface of an operation input apparatus and a second input signal generated in accordance with the operation on a second operation receiving unit provided on a second surface, which is different from the first surface, of the operation input apparatus;

acquiring opposing information indicating which surface of the first surface and the second surface is opposed to an operator of the operation input apparatus; and changing one of first processing corresponding to the first input signal and second processing corresponding to the second input signal based on the acquired opposing information.

(18)

An input signal receiving apparatus including:

an input signal receiving unit that receives, from the operation input apparatus, a first input signal generated in accordance with an operation on a first operation receiving unit provided on a first surface of an operation input apparatus and a second input signal generated in accordance with the operation on a second operation receiving unit provided on a second surface, which is different from the first surface, of the operation input apparatus;

an opposing information receiving unit that receives, from the operation input apparatus, opposing information indicating which surface of the first surface and the second surface is opposed to an operator of the operation input apparatus; and a processing controller that changes one of first processing corresponding to the first input signal and second processing corresponding to the second input signal based on the received opposing information.

(19)

An operation input apparatus including:

a first operation receiving unit provided on a first surface of a housing;

a second operation receiving unit provided on a second surface, which is different from the first surface, of the housing;

an input signal receiving unit that receives a first input signal generated in accordance with an operation on the first operation receiving unit and a second input signal generated in accordance with the operation on the second operation receiving unit;

a determination unit that determines which surface of the first surface and the second surface is opposed to an operator; and a processing controller that changes one of first processing corresponding to the first input signal and second processing corresponding to the second input signal based on a determination result by the determination unit.

(20)

An input system including:

an operation input apparatus; and an input signal receiving apparatus that receives an input signal from the operation input apparatus, wherein the operation input apparatus includes a first operation receiving unit provided on a first surface of a housing, a second operation receiving unit provided on a second surface, which is different from the first surface, of the housing, an input signal receiving unit that receives a first input signal generated in accordance with an operation on the first operation receiving unit and a second input signal generated in accordance with the operation on the second operation receiving unit, and a determination unit that determines which surface of the first surface and the second surface is opposed to an operator of the operation input apparatus, and wherein the input signal receiving apparatus includes, an input signal receiving unit that receives, from the operation input apparatus, the first input signal and the second input signal that are received by the input signal receiving unit, an opposing information receiving unit that receives, from the operation input apparatus, a determination result by the determination unit of which surface of the first surface and the second surface is opposed to the operator of the operation input apparatus, and a processing controller that changes one of first processing corresponding to the first input signal and second processing corresponding to the second input signal based on the received determination result.

REFERENCE SIGNS LIST

10 remote operation system
100 TV apparatus
110 display unit
120 communication unit
130 storage unit
140 controller unit
142 input receiving unit
143 opposing information receiving unit
144 application determination unit
145 input processing controller
146 display controller
200 remote control apparatus
201 housing 210 front side
211 first input unit
212 cross key unit
214 button unit
216 touch pat unit
220 back side
221 second input unit
222 keyboard unit
230 imaging unit
232 communication unit
234 storage unit
242 acceleration sensor
244 inclination sensor
250 controller unit
252 posture detection unit
253 determination unit
254 communication controller
550 controller unit
554 input receiving unit
555 input processing controller

The invention claimed is:

1. An input system comprising:
an operation input apparatus; and
an input signal receiving apparatus that receives an input signal from the operation input apparatus,
wherein the operation input apparatus includes
a first operation receiving unit provided on a first surface of a housing,
a second operation receiving unit provided on a second surface, which is different from the first surface, of the housing,
an input signal receiving unit that receives a first input signal generated in accordance with an operation on the first operation receiving unit and a second input signal generated in accordance with the operation on the second operation receiving unit, and
a determination unit that determines which surface of the first surface and the second surface is opposed to an operator of the operation input apparatus, and
wherein the input signal receiving apparatus includes,
an input signal receiving unit that receives, from the operation input apparatus, the first input signal and the second input signal that are received by the input signal receiving unit,
an opposing information receiving unit that receives, from the operation input apparatus, a determination result by the determination unit of which surface of the first surface and the second surface is opposed to the operator of the operation input apparatus, and
a processing controller that changes one of first processing corresponding to the first input signal and second processing corresponding to the second input signal based on the received determination result.

2. A control apparatus comprising:
an input signal receiving unit that receives a first input signal generated in accordance with an operation on a first operation receiving unit provided on a first surface of an operation input apparatus and a second input signal generated in accordance with an operation on a second operation receiving unit provided on a second surface, which is different from the first surface, of the operation input apparatus;
an opposing information acquisition unit that acquires opposing information indicating which surface of the first surface and the second surface is opposed to an operator of the operation input apparatus; and
a processing controller that changes one of first processing corresponding to the first input signal and second processing corresponding to the second input signal based on the acquired opposing information,
wherein if the first surface is opposed to the operator in the acquired opposing information, the processing controller disables a portion of the second processing.

3. The control apparatus according to claim 2,
wherein the processing controller controls the first processing and the second processing on an application being executed of a plurality of applications and if the first surface is opposed to the operator in the acquired opposing information, sets the portion to be disabled in the second processing in accordance with the application being executed.

4. The control apparatus according to claim 3,
wherein the second operation receiving unit includes a plurality of operation receiving members arranged in different positions on the second surface, and
wherein, in accordance with the application being executed, the processing controller disables the second processing corresponding to the second input signal generated in accordance with an operation on one of the plurality of operation receiving members positioned in a predetermined position.

5. The control apparatus according to claim 2, wherein if the first surface is opposed to the operator in the acquired opposing information, the processing controller performs the first processing and also disables all the second processing.

6. The control apparatus according to claim 2,
wherein the processing controller disables all processing corresponding to the first input signal and the second input signal generated during switching when switching of a surface of the operation input apparatus opposed to the operator between the first surface and the second surface is detected based on the acquired opposing information.

7. The control apparatus according to claim 2,
wherein the processing controller further acquires orientation information about an orientation of a surface of the operation input apparatus and changes one of the first processing and the second processing based on the acquired opposing information and orientation information.

8. The control apparatus according to claim 7,
wherein the first operation receiving unit and the second operation receiving unit receive an operation of coordinate axes indicating an operation direction, and
wherein the processing controller changes the coordinate axes based on the acquired opposing information and orientation information, and performs processing by changing the first input signal or the second input signal to a signal corresponding to the changed coordinate axes.

9. The control apparatus according to claim 2, wherein the opposing information contains information determining which surface of the first surface and the second surface is opposed to the operator based on a detection result by an acceleration sensor that detects a posture of the operation input apparatus.

10. The control apparatus according to claim 2, wherein the opposing information contains information determining which surface of the first surface and the second surface is opposed to the operator based on a result of imaging of the operator by an imaging member.

11. The control apparatus according to claim 2, wherein the second surface is the surface positioned on an opposite side of the first surface in the operation input apparatus.

12. The control apparatus according to claim 11,
wherein the first operation receiving unit receives the operation in a state in which the operation input apparatus is positioned in a first posture,
wherein the second operation receiving unit receives the operation in the state in which the operation input apparatus is positioned in a second posture reached by rotating from the first posture around an axis where the first surface and the second surface intersect by approximately 90 degrees, and
wherein an acceleration sensor that detects acceleration in an axial direction of the operation input apparatus is provided in the operation input apparatus,
the control apparatus further comprising:
a determination unit that detects whether the operation input apparatus is positioned in the first posture or the second posture and determines which surface of the first surface and the second surface is opposed to the operator based on a magnitude of the acceleration in the axial direction in a detected posture and a magnitude relation to a predetermined threshold.

13. The control apparatus according to claim 12,
wherein the determination unit determines which surface of the first surface and the second surface is opposed to the operator by changing the magnitude of the predetermined threshold when one operation receiving unit of the first operation receiving unit and the second operation receiving unit, that receives the operation in the detected posture, receives the operation a predetermined number of times or more in a predetermined time.

14. The control apparatus according to claim 2, wherein the processing controller causes a notification unit to make a notification of notification information representing the surface determined to be opposed to the operator based on the acquired opposing information.

15. The control apparatus according to claim 2,
wherein the processing controller forcibly performs processing corresponding to the operation of one operation receiving unit regardless of the opposing information when the one operation receiving unit of the first operation receiving unit and the second operation receiving unit receives the operation a predetermined number of times or more in a predetermined time.

16. A control method comprising:
receiving a first input signal generated in accordance with an operation on a first operation receiving unit provided on a first surface of an operation input apparatus and a second input signal generated in accordance with operation on a second operation receiving unit provided on a second surface, which is different from the first surface, of the operation input apparatus;
acquiring opposing information indicating which surface of the first surface and the second surface is opposed to an operator of the operation input apparatus; and
changing one of first processing corresponding to the first input signal and second processing corresponding to the second input signal based on the acquired opposing information,
wherein if the first surface is opposed to the operator in the acquired opposing information, a portion of the second processing is disabled.

17. A non-transitory computer readable medium having stored thereon, a set of computer-executable instructions, for causing a computer to perform steps comprising:
receiving a first input signal generated in accordance with an operation on a first operation receiving unit provided on a first surface of an operation input apparatus and a second input signal generated in accordance with an operation on a second operation receiving unit provided on a second surface, which is different from the first surface, of the operation input apparatus;
acquiring opposing information indicating which surface of the first surface and the second surface is opposed to an operator of the operation input apparatus; and
changing one of first processing corresponding to the first input signal and second processing corresponding to the second input signal based on the acquired opposing information,
wherein if the first surface is opposed to the operator in the acquired opposing information, a portion of the second processing is disabled.

18. An input signal receiving apparatus comprising:
an input signal receiving unit that receives, from the operation input apparatus, a first input signal generated in accordance with an operation on a first operation receiving unit provided on a first surface of an operation input apparatus and a second input signal generated in accordance with an operation on a second operation receiving unit provided on a second surface, which is different from the first surface, of the operation input apparatus;
an opposing information receiving unit that receives, from the operation input apparatus, opposing information indicating which surface of the first surface and the second surface is opposed to an operator of the operation input apparatus; and
a processing controller that changes one of first processing corresponding to the first input signal and second processing corresponding to the second input signal based on the received opposing information,
wherein the processing controller disables all processing corresponding to the first input signal and the second input signal generated during switching when switching of a surface of the operation input apparatus opposed to the operator between the first surface and the second surface is detected based on the received opposing information.

19. An operation input apparatus comprising:
a first operation receiving unit provided on a first surface of a housing;
a second operation receiving unit provided on a second surface, which is different from the first surface, of the housing;
an input signal receiving unit that receives a first input signal generated in accordance with an operation on the first operation receiving unit and a second input signal generated in accordance with an operation on the second operation receiving unit;
a determination unit that determines which surface of the first surface and the second surface is opposed to an operator; and
a processing controller that changes one of first processing corresponding to the first input signal and second processing corresponding to the second input signal based on a determination result by the determination unit,
wherein if the first surface is opposed to the operator in the acquired opposing information, the processing controller disables a portion of the second processing.

* * * * *